US012696261B2

(12) United States Patent
Wong et al.

(10) Patent No.: US 12,696,261 B2
(45) Date of Patent: Jul. 28, 2026

(54) METHODS, COMMUNICATIONS DEVICES, AND INFRASTRUCTURE EQUIPMENT

(71) Applicant: Sony Group Corporation, Tokyo (JP)

(72) Inventors: Shin Horng Wong, Basingstoke (GB); Yassin Aden Awad, Basingstoke (GB); Yuxin Wei, Basingstoke (GB); Vivek Sharma, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 352 days.

(21) Appl. No.: 18/292,928

(22) PCT Filed: Jun. 23, 2022

(86) PCT No.: PCT/EP2022/067143
§ 371 (c)(1),
(2) Date: Jan. 29, 2024

(87) PCT Pub. No.: WO2023/025432
PCT Pub. Date: Mar. 2, 2023

(65) Prior Publication Data
US 2024/0340880 A1    Oct. 10, 2024

(30) Foreign Application Priority Data

Aug. 23, 2021    (EP) ...................................... 21192672

(51) Int. Cl.
*H04W 72/04*        (2023.01)
*H04W 72/0446*      (2023.01)
            (Continued)

(52) U.S. Cl.
CPC ....... *H04W 72/12* (2013.01); *H04W 72/0446* (2013.01); *H04W 72/231* (2023.01); *H04W 76/20* (2018.02)

(58) Field of Classification Search
None
See application file for complete search history.

(56) References Cited

U.S. PATENT DOCUMENTS

2018/0367289 A1    12/2018    Kim et al.

FOREIGN PATENT DOCUMENTS

WO        2018/080274 A1      5/2018
WO        WO-2018127424 A1 *  7/2018    ........... H04L 5/0062

OTHER PUBLICATIONS

3rd Generation Partnership Project, "Technical Specification Group Radio Access Network; NR; Physical layer procedures for control (Release 16)", 3GPP TS 38.213 V16.6.0, Jun. 2021, pp. 1-187.
(Continued)

*Primary Examiner* — Gary Lafontant
(74) *Attorney, Agent, or Firm* — XSENSUS LLP

(57)                ABSTRACT
A method including receiving an indication of a first pattern for one of a plurality of time-divided portions of a wireless radio interface from a wireless communications network, the first pattern defining one or more uplink resource units for transmitting uplink data to the wireless communications network and/or one or more downlink resource units for receiving downlink data from the wireless communications network, receiving an overwrite indicator from the wireless communications network indicating that the communications device is able to use at least one of the downlink resource units for transmitting uplink data to the wireless communications network and/or at least one of the uplink resource units for receiving downlink data from the wireless communications network, and determining a second pattern for the time-divided portion of the wireless radio interface to replace the first pattern by overwriting at least a portion of the first pattern based on the overwrite indicator.

20 Claims, 15 Drawing Sheets

(51) Int. Cl.
    *H04W 72/12*       (2023.01)
    *H04W 72/231*     (2023.01)
    *H04W 76/20*       (2018.01)

(56)              References Cited

OTHER PUBLICATIONS

3rd Generation Partnership Project, "Technical Specification Group Radio Access Network; NR; Physical channels and modulation (Release 16)", 3GPP TS 38.211 V16.2.0, Jun. 2020, pp. 1-131.

Holma et al., "LTE for UMTS OFDMA and SC-FDMA Based Radio Access", John Wiley and Sons, 2009, 232 pages.

NTT Docomo, Inc., "Remaining issues on group-common PDCCH", 3GPP TSG RAN WG1 Meeting 90bis, R1-1718205, Oct. 9-13, 2017, pp. 1/3-10/3.

OPPO, "Remaining issues on GC-PDCCH", 3GPP TSG RAN WG1 Meeting #91, R1-1719984, Nov. 27-Dec. 1, 2017, 8 pages.

RWS-210026, "On NR Full Duplex," Qualcomm, 3GPP TSG RAN Rel-18 workshop, Jun. 28-Jul. 2, 2021, 9 pages.

3rd Generation Partnership Project, "Technical Specification Group Radio Access Network; NR: Physical channels and modulation (Release 16)", 3GPP TS 38.211 V16.6.0, Jun. 2021, pp. 1-134.

International Search Report and Written Opinion mailed on Oct. 7, 2022, received for PCT Application PCT/EP2022/067143, filed on Jun. 23, 2022, 11 pages.

* cited by examiner

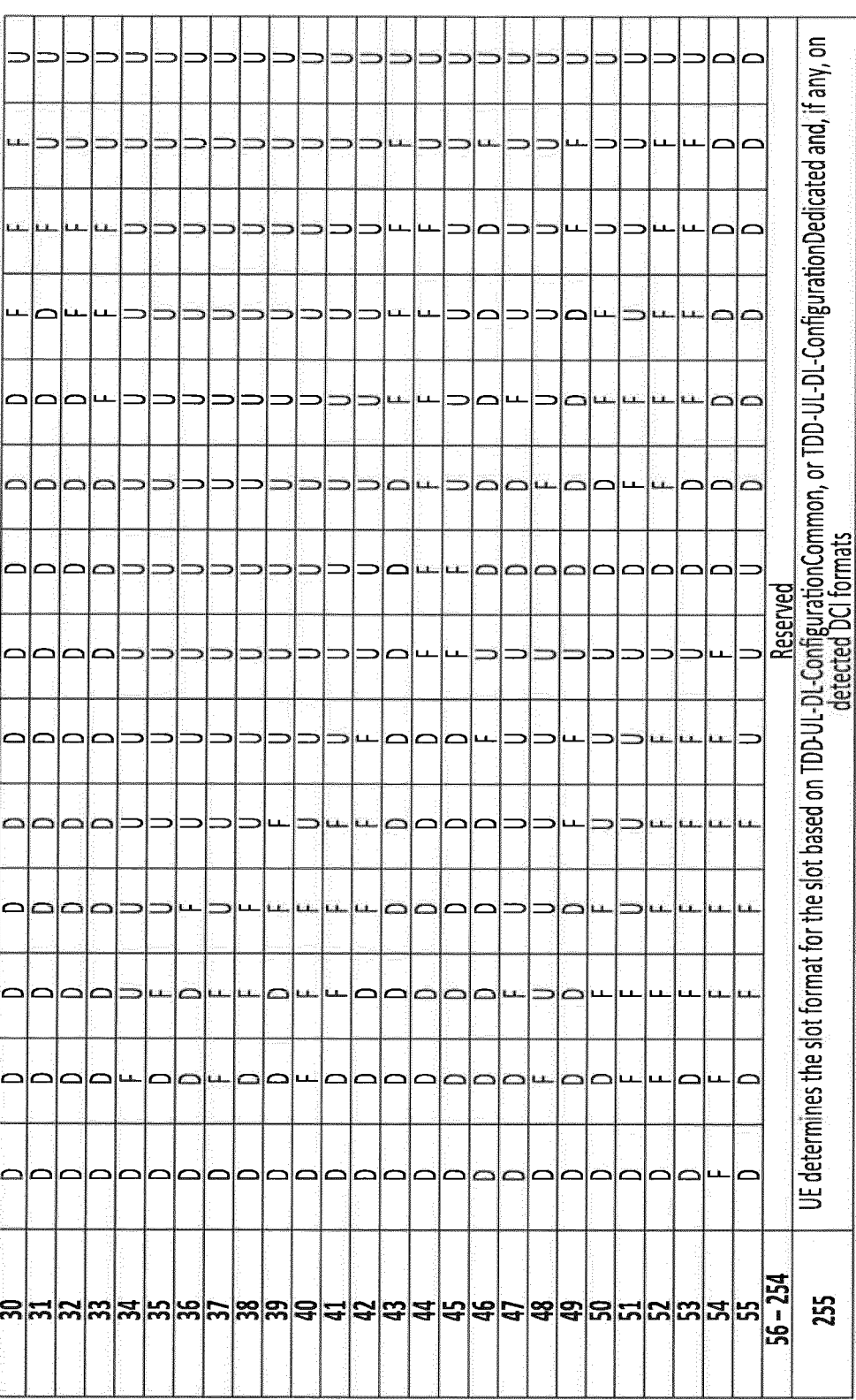

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | U | U | U | U | U | U |
| 45 | D | D | D | D | D | D | F | F | F | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | U | U | U | U | U | D | F | U | U | U | U | U |
| 53 | D | D | F | U | U | U | U | D | D | F | U | U | U | U |
| 54 | F | F | F | F | F | F | F | F | F | F | F | F | F | F |
| 55 | D | D | F | F | U | U | U | D | D | D | D | D | D | D |
| 56 – 254 | Reserved | | | | | | | | | | | | | |
| 255 | UE determines the slot format for the slot based on TDD-UL-DL-ConfigurationCommon, or TDD-UL-DL-ConfigurationDedicated and, if any, on detected DCI formats | | | | | | | | | | | | | |

FIG. 4 (continued)

METHODS, COMMUNICATIONS DEVICES, AND INFRASTRUCTURE EQUIPMENT

CROSS-REFERENCE TO RELATED APPLICATIONS

The present application is based on PCT filing PCT/EP2022/067143, filed Jun. 23, 2022, which claims priority from European Patent Application No. 21192672.0, filed Aug. 23, 2021, the contents of each are hereby incorporated by reference.

BACKGROUND

Field of Disclosure

The present disclosure relates to communications devices, infrastructure equipment and methods for the efficient use of resources by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latest generation mobile telecommunication systems, such as those based on the 3GPP defined UMTS and Long Term Evolution (LTE) architecture, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to continue to increase rapidly.

Future wireless communications networks will be expected to routinely and efficiently support communications with an ever-increasing range of devices associated with a wider range of data traffic profiles and types than existing systems are optimised to support. For example, it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Other types of device, for example used for autonomous vehicle communications and for other critical applications, may be characterised by data that should be transmitted through the network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario (data subject to stringent reliability and latency requirements).

In view of this there is expected to be a desire for future wireless communications networks, for example those which may be referred to as 5G or new radio (NR) systems/new radio access technology (RAT) systems, as well as future iterations/releases of existing systems, to efficiently support connectivity for a wide range of devices associated with different applications and different characteristic data traffic profiles and requirements.

One example of a new service is referred to as Ultra Reliable Low Latency Communications (URLLC) services which, as its name suggests, requires that a data unit or packet be communicated with a high reliability and with a low communications delay. Another example of a new service is Enhanced Mobile Broadband (eMBB) services, which are characterised by a high capacity with a requirement to support up to 20 Gb/s. URLLC and eMBB type services therefore represent challenging examples for both LTE type communications systems and 5G/NR communications systems.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method of operating a communications device configured to transmit signals to and/or to receive signals from a wireless communications network via a wireless radio interface provided by the wireless communications network. The method comprises receiving an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network, receiving an overwrite indicator from the wireless communications network indicating that the communications device is able to use at least one of the downlink resource units for transmitting uplink data to the wireless communications network and/or at least one of the uplink resource units for receiving downlink data from the wireless communications network, and determining a second pattern for the time-divided portion of the wireless radio interface to replace the first pattern by overwriting at least a portion of the first pattern based on the overwrite indicator.

Embodiments of the present technique, which, in addition to methods of operating communications devices, relate to methods of operating infrastructure equipment, communications devices and infrastructure equipment, circuitry for communications devices and infrastructure equipment, wireless communications systems, computer programs, and computer-readable storage mediums, can allow for more efficient use of radio resources by a communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
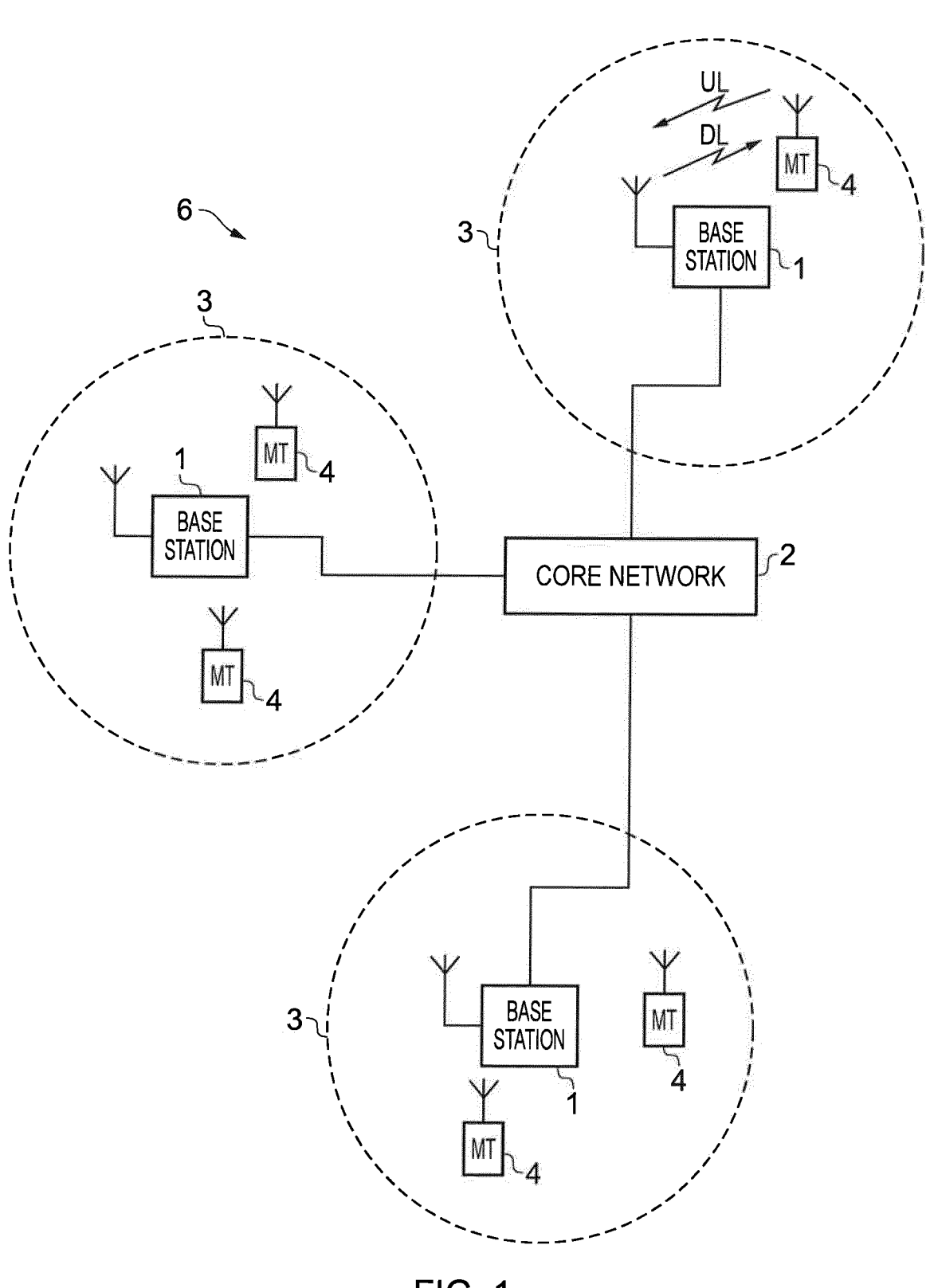
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
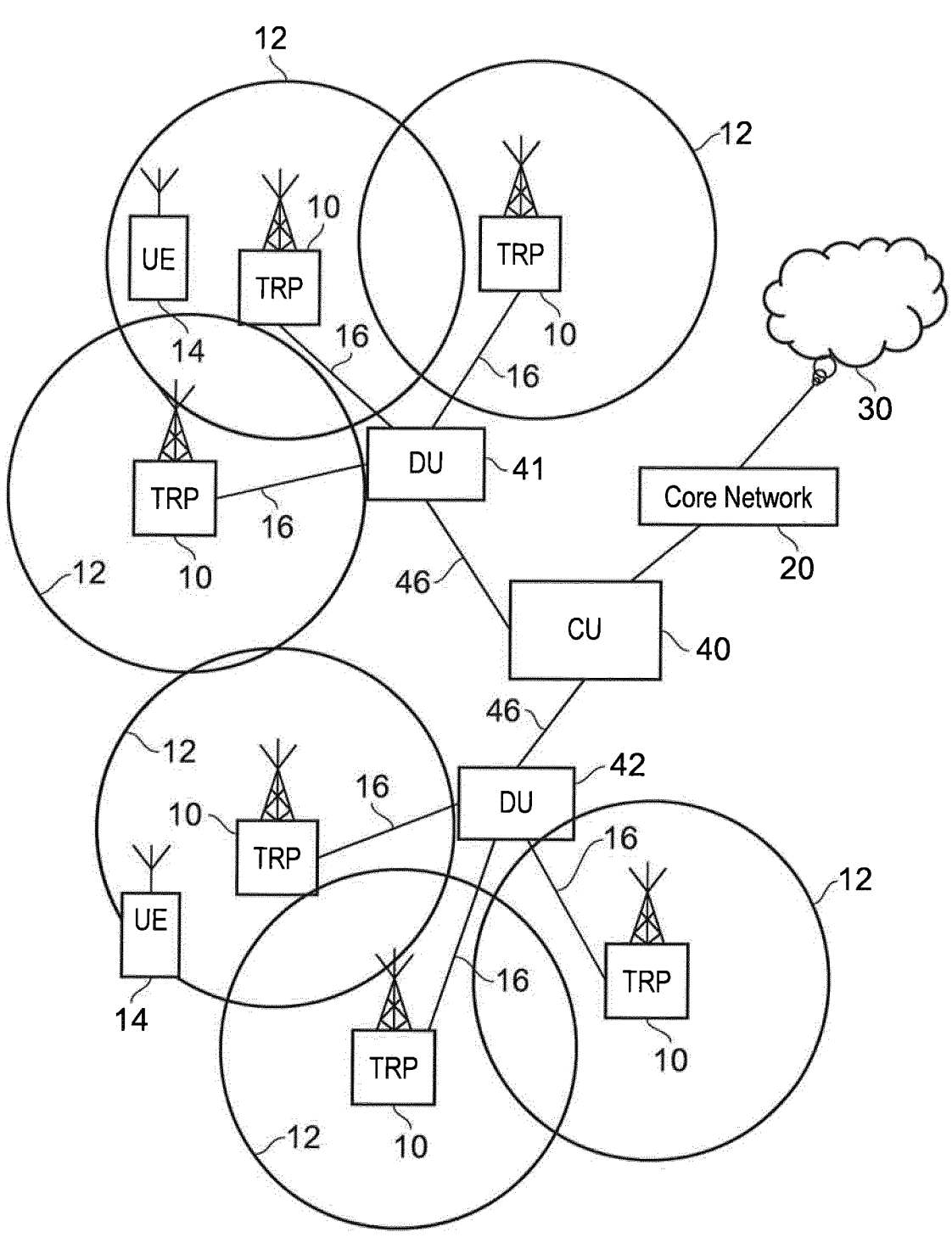
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for and used in NR and 5G is shown in FIG. 2. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus, within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly, the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 12 via one of the distributed units/TRPs 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus, certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
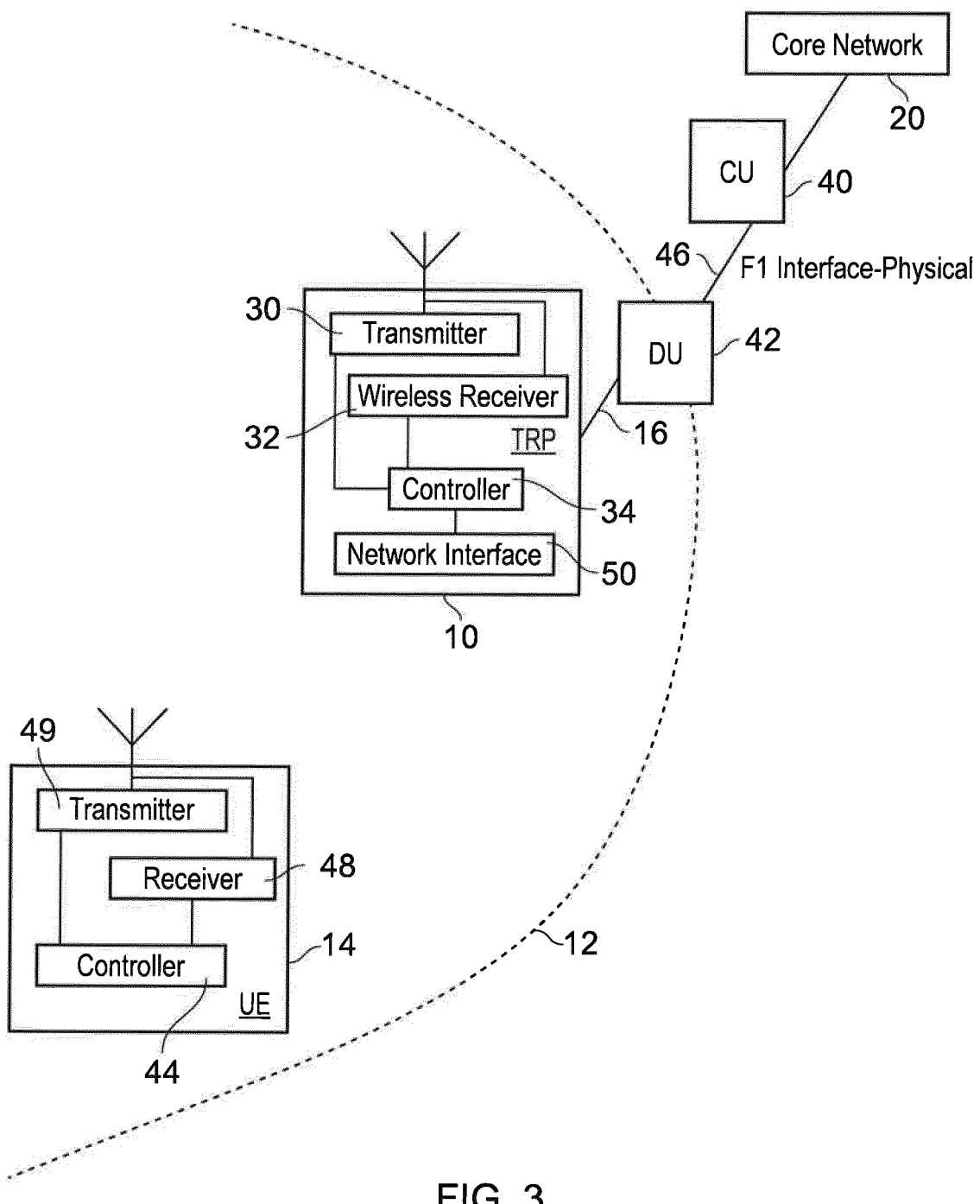
FIG. 3 is a schematic block diagram of an example infrastructure equipment and communications device which may be configured to operate in accordance with certain embodiments of the present disclosure.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium. The transmitters, the receivers and the controllers are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment/TRP/base station as well as the UE/communications device will in general comprise various other elements associated with its operating functionality.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired or wireless high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

3GPP has already completed the basic version of 5G (NR) in Rel-15. In Rel-16, some important enhancements have been incorporated such as 2-step RACH, Industrial Internet of Things (IIoT), Ultra Reliable Low Latency Communications (URLLC), Cross-link Interference (CLI) handling for Time Division Duplex (TDD), basic positioning capability and NR-based Access to Unlicensed Spectrum. Further enhancements are being developed for Rel-17 with new services and enhanced user experience, such as Small Data Transmissions (SDT), Multicast and Broadcast Services (MBS), Reduced Capability UE and Positioning enhancement.

The NR system will be further developed in Rel-18, and one of the proposed features is to enhance duplexing operation for TDD by enabling Full Duplex operation in TDD, FD-TDD [3]. Currently, TDD operates in Half Duplex (HD) mode where the entire frequency band is switched to either downlink or uplink transmissions for a time period and can then switch to the other of downlink or uplink transmissions at a later time period, and thus the gNB or UE can either transmit or receive, but not both at the same time. The motivations for enhancing duplexing operation, at least for TDD, include:

Improving system capacity: In the current TDD system, some slots are only for transmissions in the downlink (DL) direction or only for transmissions in the uplink (UL) direction, where such slots are configured semi-statically. Hence, if there is less (or indeed no) data for transmission in one direction than the other, resources will not be used or at the least will be under-utilised.

However, if resources can be used for either DL data or UL data, the resource utilisation in the system can be improved;

Reducing latency: In the current TDD system, a UE can receive DL data, but cannot transmit UL data at the same time, causing some delays. If a gNB or a UE is allowed to transmit and receive at the same time, the traffic latency can be improved; and Improving uplink coverage: A UE usually is power-limited in the UL direction at the cell-edge. The coverage at the cell-edge can be improved if more time domain resources are assigned to UL transmissions (e.g. repetitions). However, if the UL direction is assigned more time resources, fewer time resources will therefore be left for the DL direction, and hence the system will become unbalanced. FD-TDD is able to help a UE by assigning more time resources as and when required, without sacrificing the DL resources.

In FD-TDD, the gNB (at least) can transmit and receive data/signals to/from a UE or multiple UEs at the same time on the same frequency band. The UEs can be HD-TDD or FD-TDD depending on their capability. FD-TDD is achieved for such UEs as follows:

For an HD-TDD UE, full duplex TDD is achieved at the gNB by scheduling a UE in the DL and scheduling another UE in the UL within the same Orthogonal Frequency Division Multiplexed (OFDM) symbol;

For an FD-TDD UE, full duplex TDD is achieved both at the gNB and the UE, where the gNB can simultaneously schedule this UE in the DL and UL within the same OFDM symbol, but the DL and UL are scheduled in different frequency units (e.g. PRBs) of the system bandwidth. FD-TDD UEs therefore require more complex hardware compared to HD-TDD UEs.

Further aspects of full-duplex or flexible TDD operation can be found in co-pending European patent No. 3545716 [4], the contents of which are hereby incorporated by reference.

TDD Slot Configurations

In the current NR system, a radio frame contains a number of slots $$\left(N_{slot}^{frame,\mu}\right)$$

depending on the subcarrier spacing (Δf) of the bandwidth part (BWP). For example, there are ten slots for a 15 KHz subcarrier spacing, twenty slots for a 30 KHz subcarrier spacing, and so on. Other structures are summarised in Table I below, which is reproduced from [5].

TABLE I

| Slots per frame and number of OFDM symbols per slot for different subcarrier spacing | | | | |
|---|---|---|---|---|
| μ | Δf = $2^{\mu} \cdot 15$[kHz] | $N_{symb}^{slot}$ | $N_{slot}^{frame,\,\mu}$ | $N_{slot}^{subframe,\,\mu}$ |
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |

A slot format refers to an arrangement of OFDM symbols in a slot, where each OFDM symbol (which may sometimes be referred to just as a "symbol") can be configured as 'Downlink' (DL), 'Flexible' (FL), or 'Uplink' (UL). The UE receives data in a DL symbol and transmits data in an UL symbol. The FL symbol can be further indicated for use in either of the DL or the UL.

In the current TDD system, there are four ways to configure the slot format. These consist of two Radio Resource Control (RRC) configurations (i.e. semi-static configurations) and two dynamic configurations:

Cell Common semi-static slot format: The slot format is configured in the parameter tdd-UL-DL-Configuration-Common and is broadcast in SIB1. This enables a UE in Idle Mode or a UE that has just attached to the cell to determine the slot format of the cell, which would be defined together with other information, such as the location of other SIBs and common PDCCH and PRACH resources. The gNB can configure two slot format patterns that repeat periodically, where in each pattern, a period of $P_{CellComon}$ slots are configured as follows:

The first $d_{slots}$ in the period are all DL symbols ($d_{slots}$ can be zero);

The slot after the first $d_{slots}$ is a slot where the first $d_{sym}$ are DL symbols;

The last $u_{slots}$ in the period are all UL symbols ($u_{slots}$ can be zero);

The slot before the last $u_{slots}$ is a slot where the last $u_{sym}$ are UL symbols; and The remaining OFDM symbols between these DL and UL symbols are FL symbols;

UE specific semi-static slot format: The slot format is configured in the RRC parameter TDD-UL-DL-ConfigDedicated, which is configured on a per-UE basis, i.e. after the UE has an RRC Connection to the network. Each slot format for a slot in a radio frame (10 ms) can be explicitly configured as follows:

The first nrofDownlinkSymbols symbols in the slot are DL symbols;

The last nrofUplinkSymbols symbols in the slot are UL symbols; and

The remaining symbols in the slot are FL symbols;

Slot Format Indicator (SFI): The SFI is transmitted to a group of UEs using Group Common Downlink Control Information (GC-DCI) Format 2_0, where the DCI is masked with an SFI-Radio Network Temporary Identifier (RNTI). The SFI is RRC configured with a Slot Format Combination, which is a subset of a 255 possible slot formats. That is, the network selects a subset of slot formats that can be dynamically indicated in the SFI. Each Slot Format in the Slot Format Combination is assigned a Slot Format Combination ID and the SFI signals this Slot Format Combination ID to the group of UEs. Currently up to 56 slot formats are defined for SFI, with a potential of up to 255 different slot formats, where each slot format identified with an index that indicates a unique combination of DL, UL and FL OFDM symbols. The possible slot formats are summarized in the table of FIG. 4, which is reproduced from [1]. The GC-DCI carrying the SFI has a monitoring periodicity of $P_{SFI}$ where the slot format indicated in the SFI is applicable for all slots within $P_{SFI}$; and DCI carrying Dynamic Grants: The dynamic grants, e.g. DL Grant or UL Grant, do not specifically indicate the slot format, but can schedule a UE with a DL transmission or an UL transmission overlapping FL symbols, and this implicitly tells the UE that these FL symbols are used for DL or UL.

The UE is not expected to be given contradictory slot format configurations by these four slot format configurations. To avoid contradictory slot formats, an order of precedence is followed—in the order the configurations are described above—where for example the Cell Common semi-static slot format has a higher precedence over the UE specific semi-static slot format, such that symbols configured as DL or UL in the Cell Common semi-static slot format cannot be changed by the UE specific semi-static slot format. Only FL symbols configured by the Cell Common semi-static slot format can be changed to DL or UL symbols (or indeed remain as FL symbols) by the UE specific semi-static slot format. The resultant slot format as a combination of Cell Common semi-static slot format and UE specific slot format is referred to as a semi-static slot format, and therefore the resultant OFDM symbol format due to the combination of Cell Common semi-static slot format and UE specific semi-static slot format configurations can be referred to as "semi-static DL symbols", "semi-static UL symbols" and "semi-static FL symbols".

Figure 5:
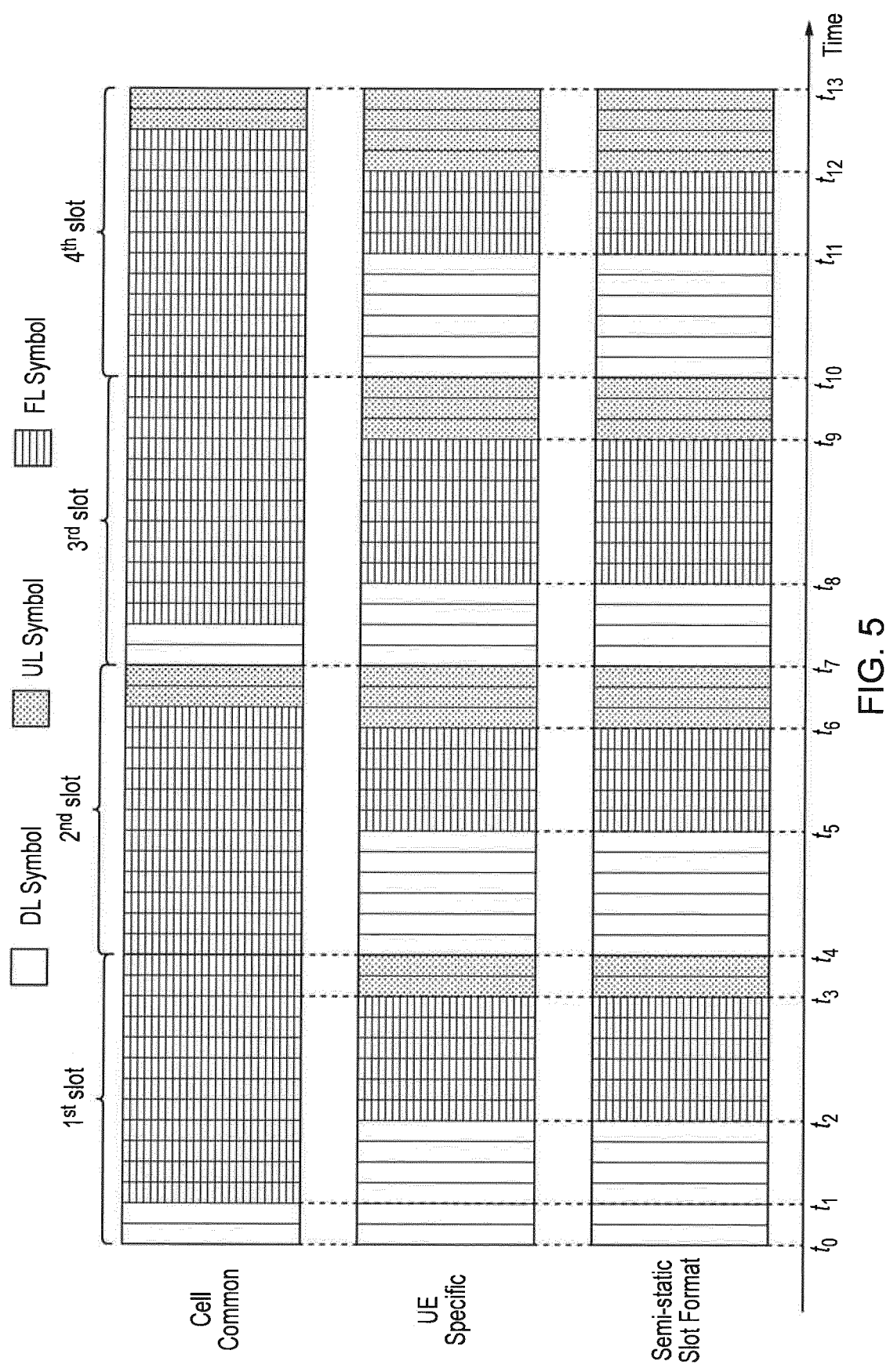
FIG. 5 illustrates an example of a semi-statically configured slot format configuration.

An example semi-static configuration is shown in FIG. 5, where the Cell Common and UE specific semi-static slot formats are configured as follows:

Cell Common semi-static slot format: $P_{CellComon}$=2 slots, $d_{slots}$=0, $d_{sym}$=2, $u_{slots}$=0, $u_{sym}$=2;

UE specific semi-static slot format for the first four slots (other slots in the radio frame are not shown in this example):

First slot: nrofDownlinkSymbols=6, nrofUplinkSymbols=2;

Second slot: nrofDownlinkSymbols=6, nrofUplinkSymbols=3;

Third slot: nrofDownlinkSymbols=4, nrofUplinkSymbols=3; and

Fourth slot: nrofDownlinkSymbols=6, nrofUplinkSymbols=4.

Since the UE specific semi-static slot format can only override FL symbols configured by the Cell Common semi-static slot format, in this example, the resultant semi-static slot format (shown at the bottom of FIG. 5) follows the configuration of the UE specific semi-static slot format. If there were not enough FL symbols configured by the Cell Common semi-static slot format for the UE specific semi-static slot format to overwrite with UL or DL symbols appropriately, then the resultant semi-static slot format would not fully follow the configuration of the UE specific semi-static slot format.

RRC (or semi-static) slot format configurations in turn have precedence over dynamic slot format configurations. That is, semi-static DL symbol and semi-static UL symbol cannot be changed by SFI, but only semi-static FL symbol can be changed by SFI to be either DL or UL symbols (or indeed remain as FL symbols). Similarly, SFI has a higher precedence over Dynamic Grants; that is, the Dynamic Grants cannot implicitly change a semi-static DL symbol, semi-static UL symbol and semi-static FL symbol that has been indicated by the SFI as DL or UL. For example, a DL Grant cannot schedule a PDSCH overlapping semi-static UL symbols or semi-static FL symbols that has been indicated as UL by the SFI. Only remaining FL symbols, i.e. semi-static FL symbols that are indicated as FL by the SFI can be implicitly indicated by the DL Grant and UL Grant as DL or UL symbols. If SFI is not configured or the UE did not detect SFI, then the UE follows the semi-static slot format.

Figure 4:
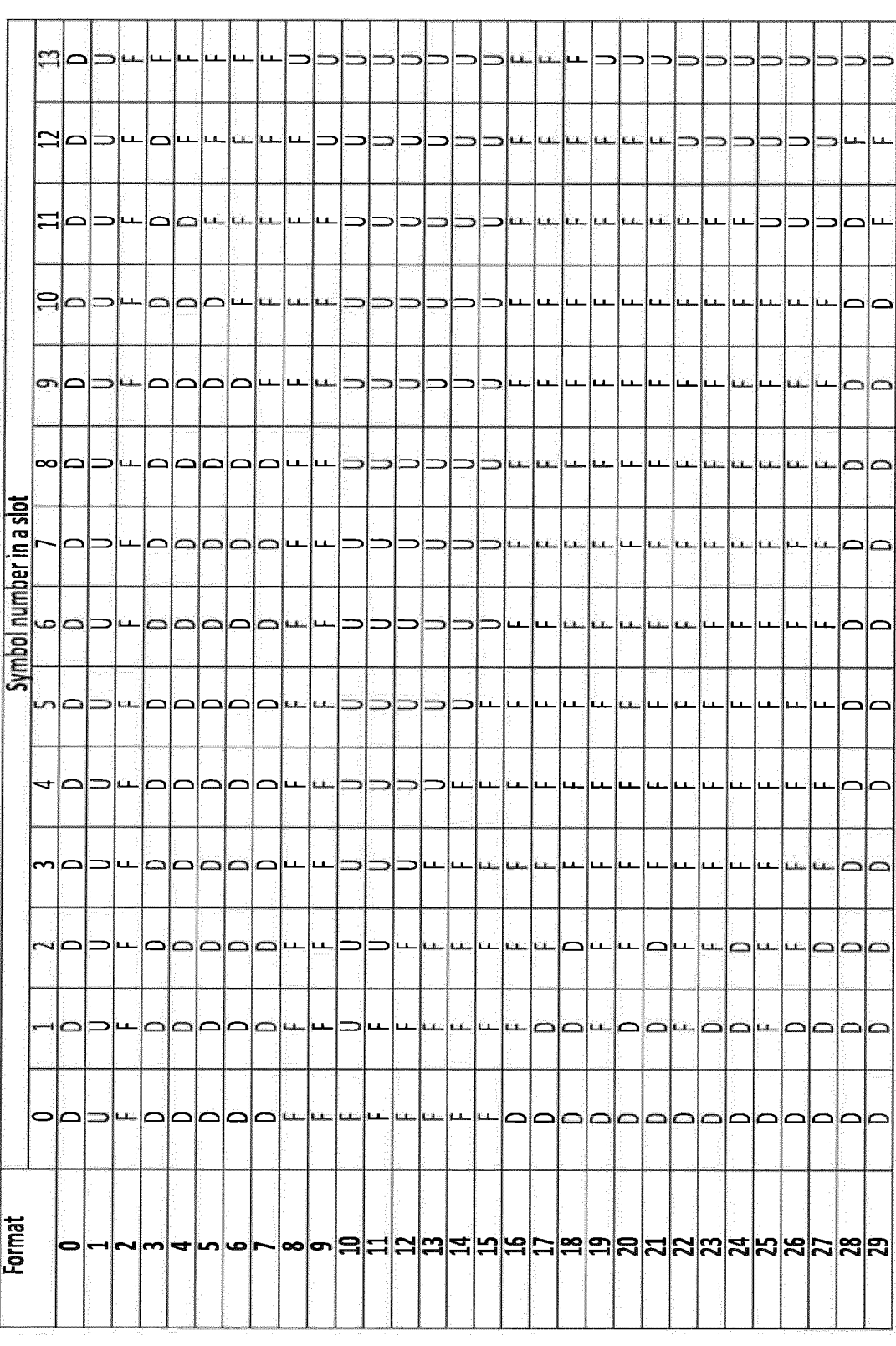
FIG. 4 shows a table, reproduced from [1], illustrating the possible slot formats that may be indicated by a slot format indicator (SFI)
Figure 6:
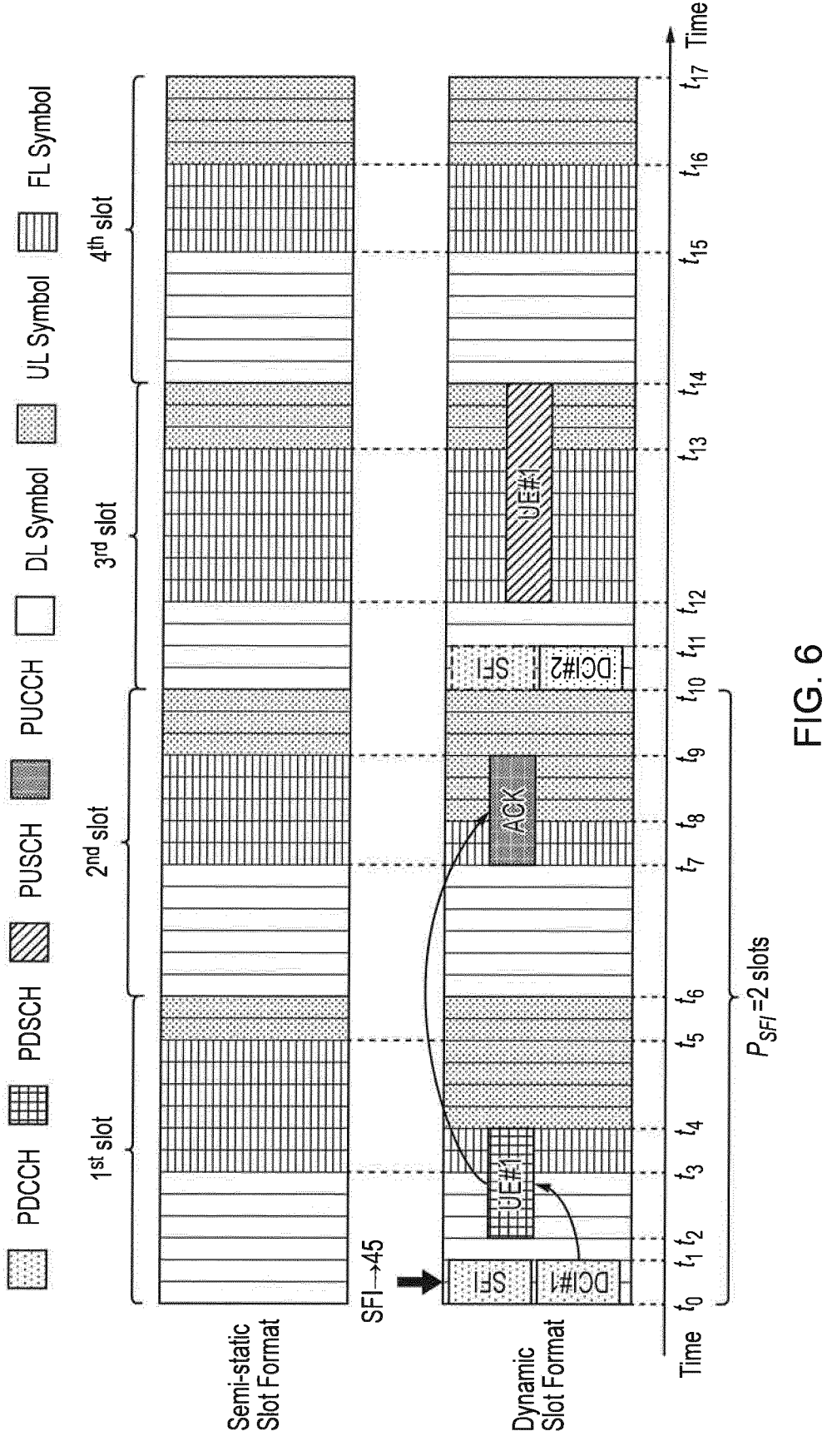
FIG. 6 illustrates an example of a dynamically indicated slot format configuration.

An example, dynamic slot formation configurations is shown in FIG. 6, where the UE, i.e. UE #1, has the semi-static slot configuration as shown in the example in FIG. 5. UE #1 is configured with an SFI that has a periodicity of $P_{SFI}$=2 slots. In the first slot, the UE detects the SFI at time $t_1$, where the indicated value of the Slot Format Combination ID maps to Slot Format of 45. This slot format has a pattern, as indicated in the table of FIG. 4 of {D, D, D, D, D, D, F, F, U, U, U, U, U, U}, which is applicable to the first and second slots for $P_{SFI}$=2 slots. That is, the SFI changed the semi-static F symbols between time $t_4$ to $t_5$ and $t_8$ to $t_9$ to UL symbols. At time $t_1$, the UE also detects DCI #1 which carries a DL Grant for a PDSCH scheduled between time $t_2$ and $t_4$ and with a corresponding PUCCH carrying its HARQ-ACK between time $t_7$ and $t_9$. Hence, the DL Grant in DCI #1 implicitly indicates that FL symbols $t_3$ to $t_4$ are DL symbols and FL symbols $t_7$ to $t_8$ are UL symbols. In the third slot, the UE does not detect any SFI and so the UE would follow the semi-static slot format configurations. At time $t_{11}$, the UE detects DCI #2 carrying an UL Grant scheduling a PUSCH between time $t_{12}$ to $t_{14}$. Hence, the UL Grant implicitly indicates that semi-static FL symbols between time $t_{12}$ to $t_{13}$ are UL symbols.

Figure 7:
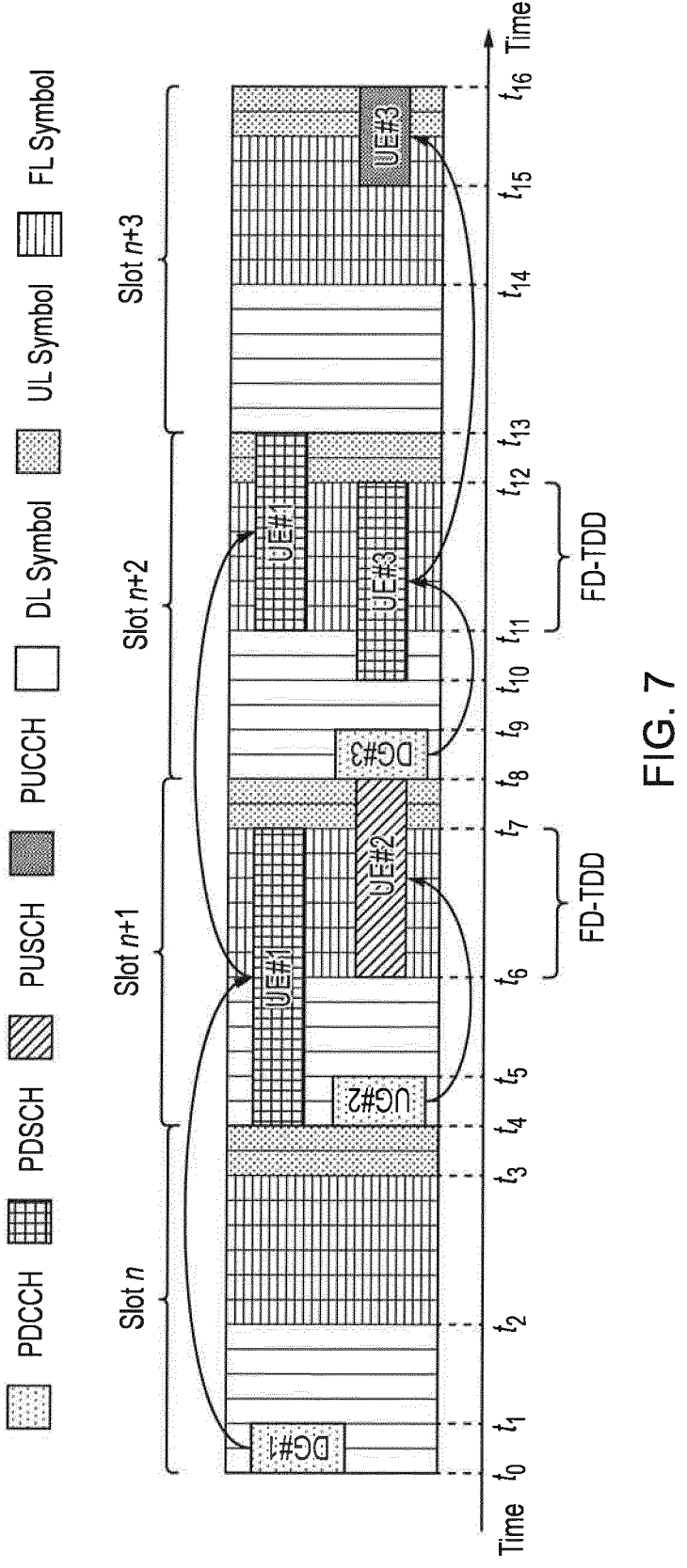
FIG. 7 shows an example of how flexible symbols can be utilised for full-duplex time division duplex (FD-TDD) operations.

Since semi-static FL symbols can be changed to either DL or UL symbols, FD-TDD operations can utilise this legacy slot format configurations for two or more HD-TDD UEs, by dynamically indicating one UE to perform UL transmissions and another UE to perform DL receptions within the same semi-static FL symbols. These UEs still obey the legacy slot format configuration rules but from the gNB's point of view, these UEs are operating in FD-TDD. An example is shown in FIG. 7, showing three HD-TDD UEs, UE #1, UE #2 and UE #3 that are configured with semi-static slot format {D, D, D, D, D, D, F, F, F, F, F, F, U, U}. At time $t_1$, UE #1 receives DL Grant DG #1 which schedules a PDSCH between time $t_4$ to $t_7$ and corresponding PUCCH between time $t_{11}$ and $t_{13}$. At time $t_5$, UE #2 receives an UL Grant UG #2 scheduling a PUSCH between time $t_6$ to $t_8$. DG #1 implicitly indicates to UE #1 that semi-static FL symbols between time $t_6$ to $t_7$ are DL symbols whilst UG #2 implicitly indicates to UE #2 that these semi-static FL symbols are UL symbols. Hence by providing different slot formats for these semi-static FL symbols for UE #1 and UE #2, the gNB is able to operate FD-TDD between time $t_6$ to $t_7$. Similarly, DG #3 schedules UE #3 with PDSCH between time $t_{10}$ to $t_{12}$, which implicitly indicates that semi-static FL symbols between time $t_{11}$ to $t_{12}$ are DL symbols, whilst UE #1 is implicitly indicated to by DG #1 that these semi-static FL symbols are UL symbols. In this way, the gNB is able to operate in FD-TDD with UE #1 and UE #3 between time $t_{11}$ to $t_{12}$.

Using only legacy slot format configurations for FD-TDD has scheduling limitations however, since only the FL symbols can be utilised for FD-TDD and such FL symbols may not be widely available due to symbols semi-statically configured for UL/DL being used in legacy operations. It is possible to configure all slots with semi-static FL symbols, but there are backward compatibility issues such as SSB configurations, Common PDCCH search spaces and PRACH resources that are Cell Common semi-statically configured as DL and UL symbols for legacy UEs and are therefore difficult to be reconfigured as FL symbols. It is also typically difficult for TDD network operators to reconfigure their slot formats since they are configured based on traffic and capacity, and reconfiguration would require extensive re-dimensioning of the network, which would disrupt legacy operations. That is, reconfiguring the slot format to have large numbers FL symbols would have a major impact on legacy UEs operations.

Another issue with using only FL symbols and legacy slot format configurations for FD-TDD operation is that this cannot benefit UEs with FD-TDD capabilities. Since FD-TDD UEs are capable of transmitting and receiving at the same time, and since the legacy slot format in TDD does not allow such configurations, these FD-TDD UEs are restricted to only HD operation; i.e. such legacy slot format configurations for TDD do not cater for simultaneous transmission and reception by the same UE.

Hence a technical problem to solve is how to enable flexible scheduling for FD-TDD operations in such a manner that the legacy operations are not impacted.

Overwriting Downlink and Uplink OFDM Symbols for FD-TDD Operation

Figure 8:
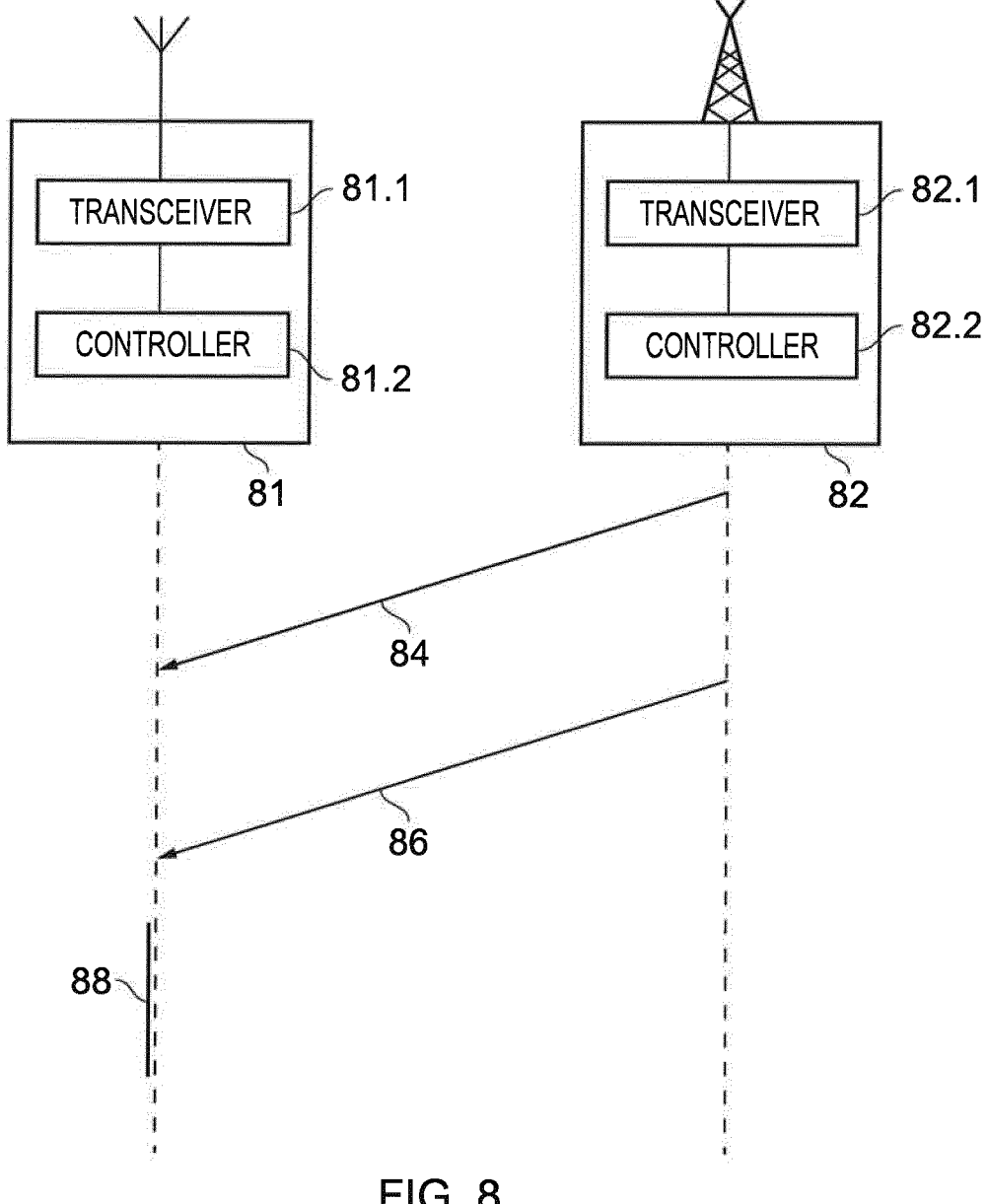
FIG. 8 shows a part schematic, part message flow diagram representation of a wireless communications system comprising a communications device and an infrastructure equipment in accordance with embodiments of the present technique.

FIG. 8 shows a part schematic, part message flow diagram representation of a first wireless communications system comprising a communications device 81 and an infrastructure equipment 82 in accordance with at least some embodiments of the present technique. The communications device 81 is configured to transmit signals to and/or receive signals from the wireless communications network, for example, to and from the infrastructure equipment 82. Specifically, the communications device 81 may be configured to transmit data to and/or receive data from the wireless communications network (e.g. to/from the infrastructure equipment 82) via a wireless radio interface provided by the wireless communications network (e.g. the Uu interface between the communications device 81 and the Radio Access Network (RAN), which includes the infrastructure equipment 82). The communications device 81 and the infrastructure equipment 82 each comprise a transceiver (or transceiver circuitry) 81.1, 82.1, and a controller (or controller circuitry) 81.2, 82.2. Each of the controllers 81.2, 82.2 may be, for example, a microprocessor, a CPU, or a dedicated chipset, etc.

As shown in the example of FIG. 8, the transceiver circuitry 81.1 and the controller circuitry 81.2 of the communications device 81 are configured in combination to receive 84 an indication of a first pattern for one of a plurality of time-divided portions (which may be for example, slots, or sub-slots, or the like) of the wireless radio interface from the wireless communications network (e.g. from the infrastructure equipment 82), the first pattern defining one or more uplink resource units (for example, UL symbols, which may be UL OFDM symbols) for transmitting uplink data to the wireless communications network (e.g. to the infrastructure equipment 82) and/or one or more downlink resource units (for example, DL symbols, which may be DL OFDM symbols) for receiving downlink data from the wireless communications network (e.g. from the infrastructure equipment 82), to receive 86 an overwrite indicator from the wireless communications network (e.g. from the infrastructure equipment 82) indicating that the communications device 81 is able to use at least one of the downlink resource units for transmitting uplink data to the wireless communications network (e.g. to the infrastructure equipment 82) and/or at least one of the uplink resource units for receiving downlink data from the wireless communications network (e.g. from the infrastructure equipment 82), and to determine 88 a second pattern for the time-divided portion of the wireless radio interface to replace the first pattern by overwriting at least a portion of the first pattern based on the overwrite indicator 86. Here, the infrastructure equipment 82 may correspondingly be configured to determine that the communications device 81 will replace 88 the first pattern with the second pattern by performing the overwriting based on the overwrite indicator that the infrastructure equipment 82 has transmitted 86. Therefore, the infrastructure equipment 82 knows that the communications device 81 may transmit uplink data in at least one resource unit indicated by the first pattern to be a downlink resource unit, and/or the infrastructure equipment 82 may transmit downlink data in at least one resource unit indicated by the first pattern to be an uplink resource unit.

Here, each of the first pattern and the second pattern may be one of a cell common semi-statically configured pattern, a UE-specific semi-statically configured pattern, an SFI, or a UE-specific dynamic indicator. The first pattern, received previously to the second pattern, may have a higher priority, higher order, or precedence, as compared to the second pattern.

Essentially, embodiments of the present technique propose that new signalling is introduced for the infrastructure equipment 82 (e.g. gNB) to overwrite some or all of the DL and UL symbols that are previously configured by a semi-statically slot format configuration and/or SFI. That is, embodiments of the present technique propose that a new overwrite indicator is introduced for the UE. This new overwrite indicator signalling allows the gNB to indicate to a UE to perform UL transmission in OFDM symbols (or any other appropriate time resource unit) that are previously configured as DL symbols and perform DL reception in OFDM symbols that are previously configured as UL downlink. That is, said overwrite indicator—which can also be referred to as an update indicator, a replacement indicator, a renewing indicator, a substitution indicator, a swap indicator, a change indicator, a switch indicator, a supersede indicator, or the like—enables:

Semi-static DL and/or UL symbols to be overwritten by an SFI and/or Dynamic Grants;

DL and/or UL symbols indicated by an SFI to be overwritten by Dynamic Grants; and DL and/or UL symbols configured Cell Common semi-static slot format to be overwritten by a UE-specific semi-static slot format, SFI and/or Dynamic Grants.

Figure 9:
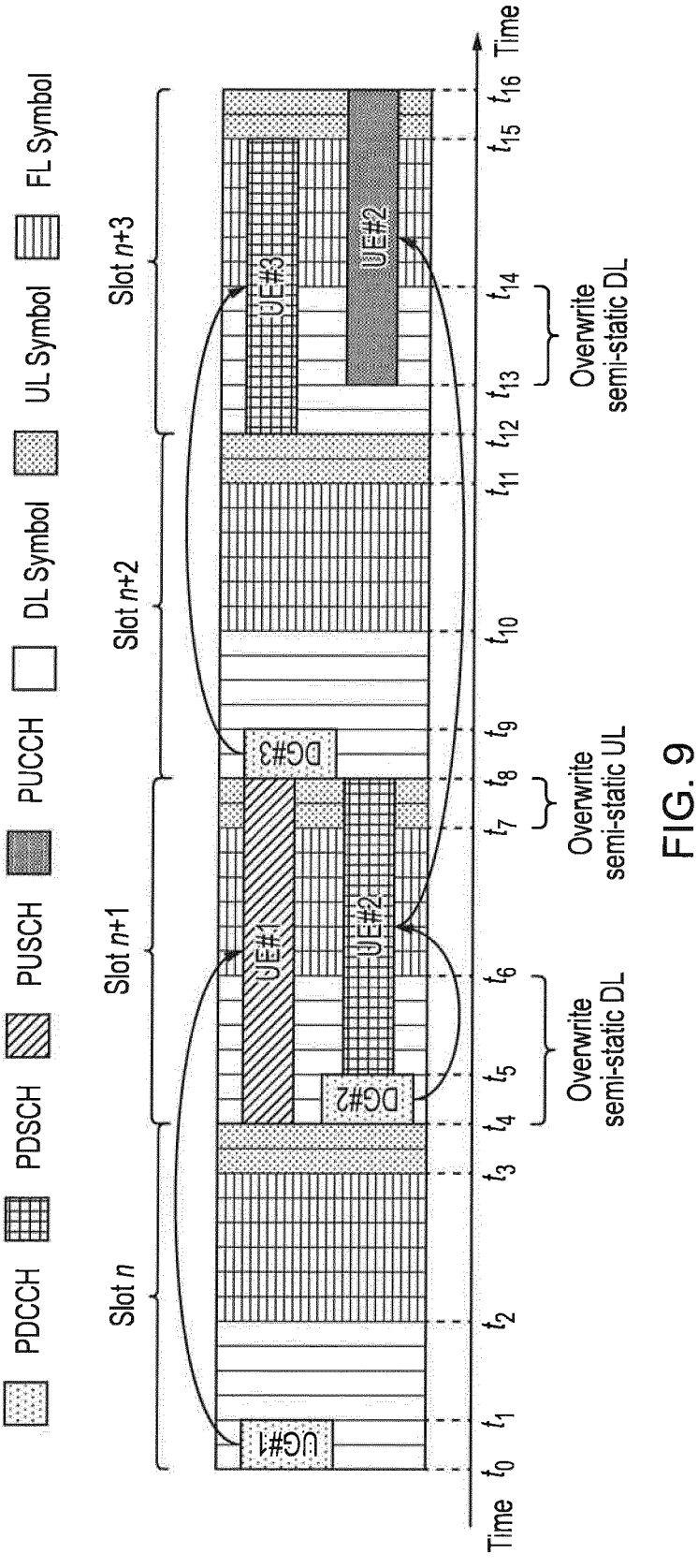
FIG. 9 shows a first example of overwriting semi-statically configured downlink and uplink symbols in accordance with embodiments of the present technique.

This allows the legacy RRC (i.e. semi-static) slot formation configuration to be maintained but allows the gNB to schedule new UEs, e.g. UEs which operate in accordance with Rel-18 and above, to operate in FD-TDD. An example is shown in FIG. 9, where UE #1, UE #2 and UE #3 are configured with semi-static slot format {D, D, D, D, D, D, F, F, F, F, F, F, U, U}. UE #1 and UE #2 are new UEs that can be indicated to overwrite semi-static DL and UL symbols whilst UE #3 is a legacy UE. At time $t_1$, UE #1 receives UL Grant UG #1 scheduling a PUSCH between time $t_4$ to $t_8$ and since it is indicated to UE #1 that it is able to overwrite semi-statically configured DL and UL symbols, it overwrites semi-static DL symbols between time $t_4$ to $t_6$ when transmitting its PUSCH. At time $t_5$, UE #2 receives DL Grant DG #2 scheduling PDSCH between time $t_5$ to $t_8$ with a corresponding PUCCH between time $t_{13}$ to $t_{16}$. It is also indicated to UE #2 that it is able to overwrite semi-static configured symbols, and here it overwrites semi-statically configured UL symbols between time $t_7$ and $t_8$ and semi-statically configured DL symbols between time $t_{13}$ to $t_{14}$. UE #3 detects DL Grant DG #3 at time $t_9$ scheduling a PDSCH between time $t_{12}$ to $t_{15}$, which does not require overwriting any semi-statically configured UL symbols. However, the gNB is able to operate in FD-TDD with UE #2 and legacy UE #3, since UE #2 overwrites semi-statically configured DL symbols when transmitting its PUCCH between time $t_{13}$ and $t_{14}$, whilst UE #3 is receiving its PDSCH. Hence, this method allows the gNB to operate in FD-TDD between two or more new UEs, and also between both legacy and new UEs. As shown in the case between legacy UE #3 and new UE #2 in Slot n+3 of FIG. 9, the legacy UE, UE #3, does not require any changes to be made its semi-static slot format configuration, but can operate (at the gNB level) in FD-TDD along with the new UE, UE #2.

Similarly, such an overwrite indicator enables an FD-TDD UE to operate in full duplex mode, by scheduling an FD-TDD UE to transmit and receive over previously configured DL and UL symbols, e.g. semi-static DL and UL symbols or symbols indicated as DL and UL by SFI.

Figure 10:
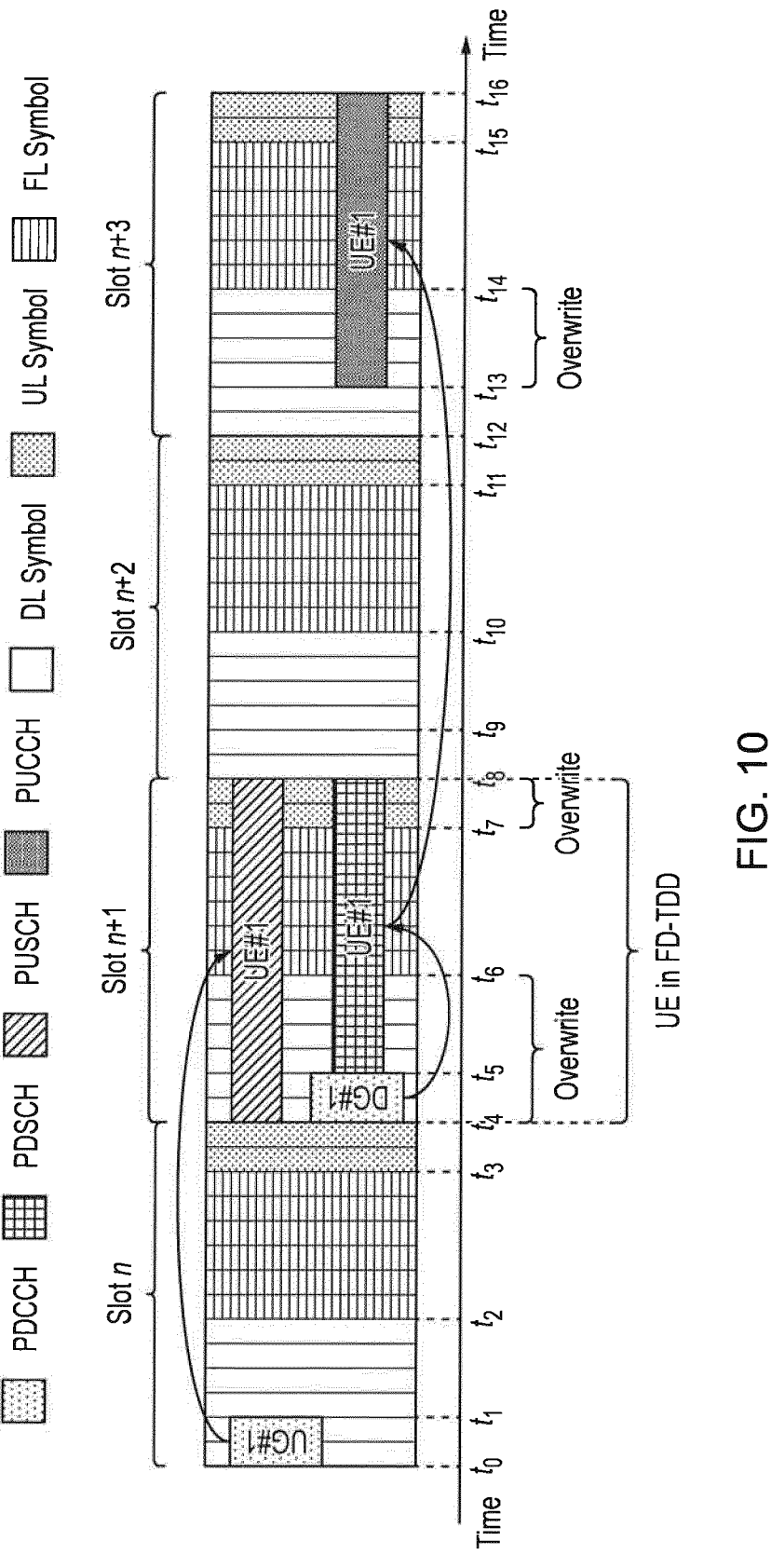
FIG. 10 shows a second example of overwriting semi-statically configured downlink and uplink symbols in accordance with embodiments of the present technique.

An example is shown in FIG. 10, where a semi-static slot configuration {D, D, D, D, D, D, F, F, F, F, F, F, U, U} is used, and UE #1 is an FD-TDD UE. UE #1 receives an UL Grant UG #1 at time $t_1$ scheduling a PUSCH occupying entire Slot n+1, and here the UE is indicated to overwrite semi-static DL and UL symbols. At time $t_5$, the UE receives DL Grant DG #1 scheduling a PDSCH occupying time $t_5$ to $t_8$ with a corresponding PUCCH between time $t_{13}$ and $t_{16}$. Since UE #1 is indicated to overwrite semi-static DL and UL symbols, it is able to transmit its PUSCH and receive the DG #1 and PDSCH in the entire Slot n+1, thereby operating in FD-TDD. For the transmission of its PUCCH, UE #1 overwrites semi-static DL symbols between time $t_{13}$ to $t_4$.

In some arrangements of embodiments of the present disclosure, the overwrite indicator is a dynamic indicator in a DCI. Here, this DCI may be the DCI carrying the DL Grant or UL Grant. In other words, the overwrite indicator may be received via downlink control information, DCI, where here the DCI provides an indication of resources (e.g. an UL or DL grant) of the wireless radio interface within which the communications device is to transmit uplink data to the wireless communications network (e.g. to the infrastructure equipment) or receive downlink data from the wireless communications network (e.g. from the infrastructure equipment), wherein the indicated resources comprise the time-divided portion of the wireless radio interface.

This indicator can be a new DCI field, which indicates whether the UE should overwrite previously configured DL and/or UL symbols, such as semi-statically configured DL and/or UL symbols and/or DL and/or UL symbols indicated by the SFI. In an implementation, a single bit may be utilised to enable or disable overwriting of previously configured DL and/or UL symbols. In other words, the overwrite indicator may be indicated by a dedicated bit carried by the DCI, the dedicated bit indicating whether or not the communications device should determine the second pattern by overwriting at least the portion of the first pattern. Alternatively or additionally, the new DCI field can be a two-bit indicator, where a first bit indicates whether the UE can overwrite DL symbols, and a second bit indicates whether the UE can overwrite UL symbols. In other words, the overwrite indicator may be indicated by two dedicated bits carried by the DCI, wherein a first of the dedicated bits indicates whether the communications device is able to use the at least one of the downlink resource units for transmitting uplink data to the wireless communications network (e.g. to the infrastructure equipment), and wherein a second of the dedicated bits indicates whether the communications device is able to use the at least one of the uplink resource units for receiving downlink data from the wireless communications network (e.g. from the infrastructure equipment). For example, an indicator of "01" means the UE is not allowed to overwrite DL symbols but it can overwrite UL symbols.

Figure 11:
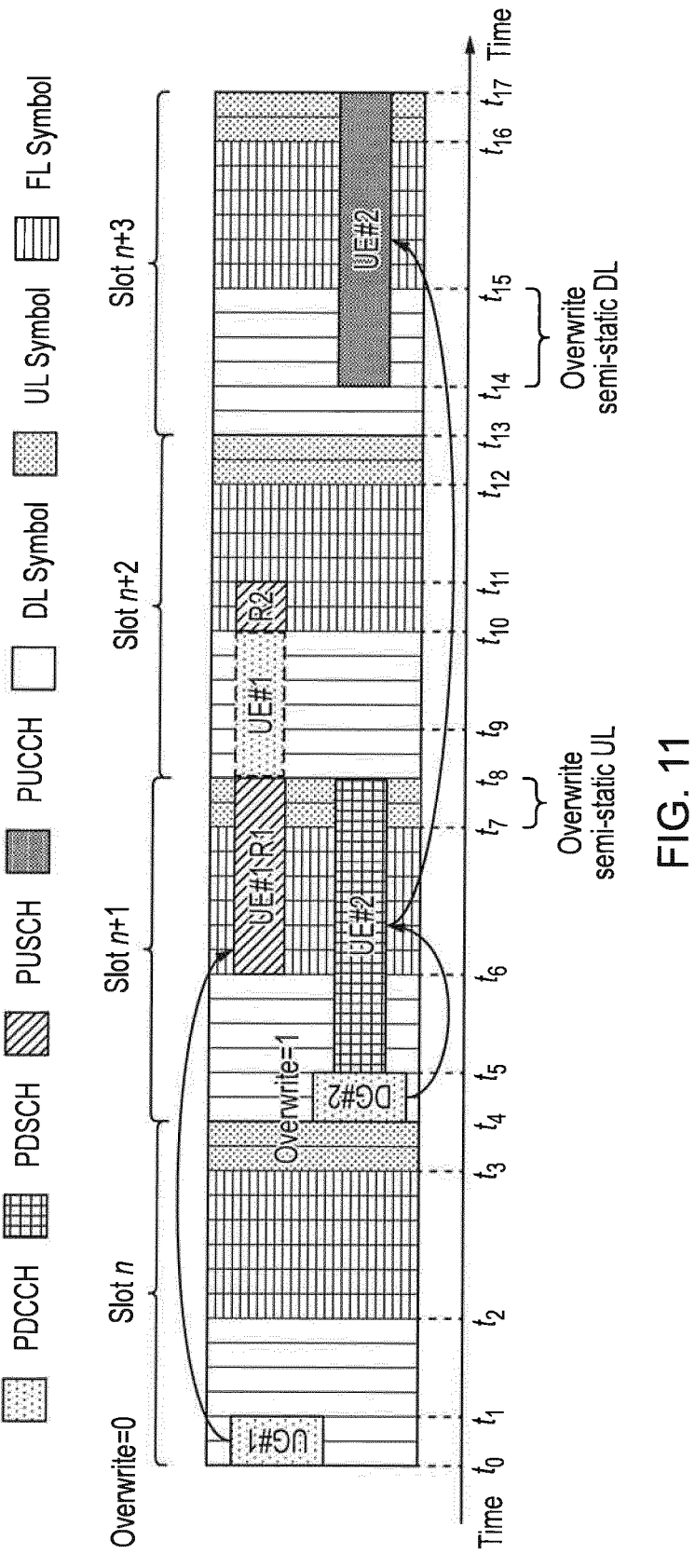
FIG. 11 illustrate how a one-bit overwrite indicator can be signalled via downlink control information (DCI) in accordance with embodiments of the present technique.

An example is shown in FIG. 11, where a one-bit overwrite indicator is implemented. Here, UE #1 receives UL Grant UG #1, scheduling a Type B PUSCH repetition with a repetition factor of two. That is, the UE is to repeat this PUSCH transmission back-to-back twice (e.g., in order to increase the reliability of the transmission). In UG #1, the overwrite indicator is set as disabled, and hence the UE is not allowed to overwrite DL (and UL) symbols. The first repetition, R1, is transmitted fully between time $t_6$ to $t_8$, since it doesn't overlap with any semi-statically configured DL symbols. However, the second PUSCH repetition, R2, overlaps with semi-statically configured DL symbols between time $t_8$ to $t_{10}$, and consequently it is segmented (as per the legacy procedure) to a smaller actual PUSCH repetition which is two symbols long between time $t_{10}$ to $t_{11}$. At time $t_5$, UE #2 receives DL Grant DG #2 scheduling PDSCH and a corresponding PUCCH. DG #2 indicates that overwriting is enabled and so the scheduled PDSCH occupying time $t_5$ to $t_8$ overwrites semi-statically configured UL symbols between time $t_7$ and $t_8$. Similarly, the corresponding PUCCH occupying time $t_4$ to $t_{17}$ overwrites semi-statically configured DL symbols between time $t_4$ to $t_{15}$.

In some arrangements of embodiments of the present disclosure, the overwrite indicator is a new RNTI that is used to mask the Cyclic Redundancy Check (CRC) of the DCI carrying a DL Grant or UL Grant. In other words, the overwrite indicator may be indicated by a radio network temporary identifier, RNTI, associated with the DCI. This RNTI can be separately configured for DL Grants and UL Grants, or a single RNTI may be applicable to both DL Grants and UL Grants. If the UE decodes the DCI using this new RNTI, this indicates that the UE can overwrite DL and/or UL symbols.

In some arrangements of embodiments of the present disclosure, the overwrite indicator is indicated in the activation DCI for Semi-Persistent Scheduling (SPS) and Configured Grant PUSCH (CG-PUSCH) resource instances. In other words, the overwrite indicator may be received via downlink control information, DCI, where here the DCI is an activation DCI which indicates that at least one preconfigured resource instance of the wireless radio interface are activated and therefore are to be used by the communications device for transmitting uplink signals to the wireless communications network (e.g. to the infrastructure equipment) and/or receiving downlink signals from the wireless communications network (e.g. from the infrastructure equipment), wherein the pre-configured resource instance comprises the time-divided portion of the wireless radio interface. Here, the overwrite indicator can be a new field in the activation DCI, or implicitly indicated for example by using a new RNTI.

In some arrangements of embodiments of the present disclosure, the overwrite indicator is transmitted in a GC-DCI. In other words, the DCI may be a group-common DCI, GC-DCI, which is common between the communications device and one or more other communications devices.

In some arrangements of embodiments of the present disclosure, the GC-DCI carries an SFI, where the SFI can overwrite semi-static DL and UL symbols. In other words, the overwrite indicator may be indicated by a slot format indicator, SFI, the SFI being carried by the GC-DCI. That is, the UE may be configured to follow the SFI instruction even if the SFI points to a slot format that overwrites semi-statically configured DL and UL symbols. This can be an SFI separate from the legacy SFI; that is, the new UE can be configured with two different SFIs, e.g. using a different SFI-RNTIs.

Figure 12:
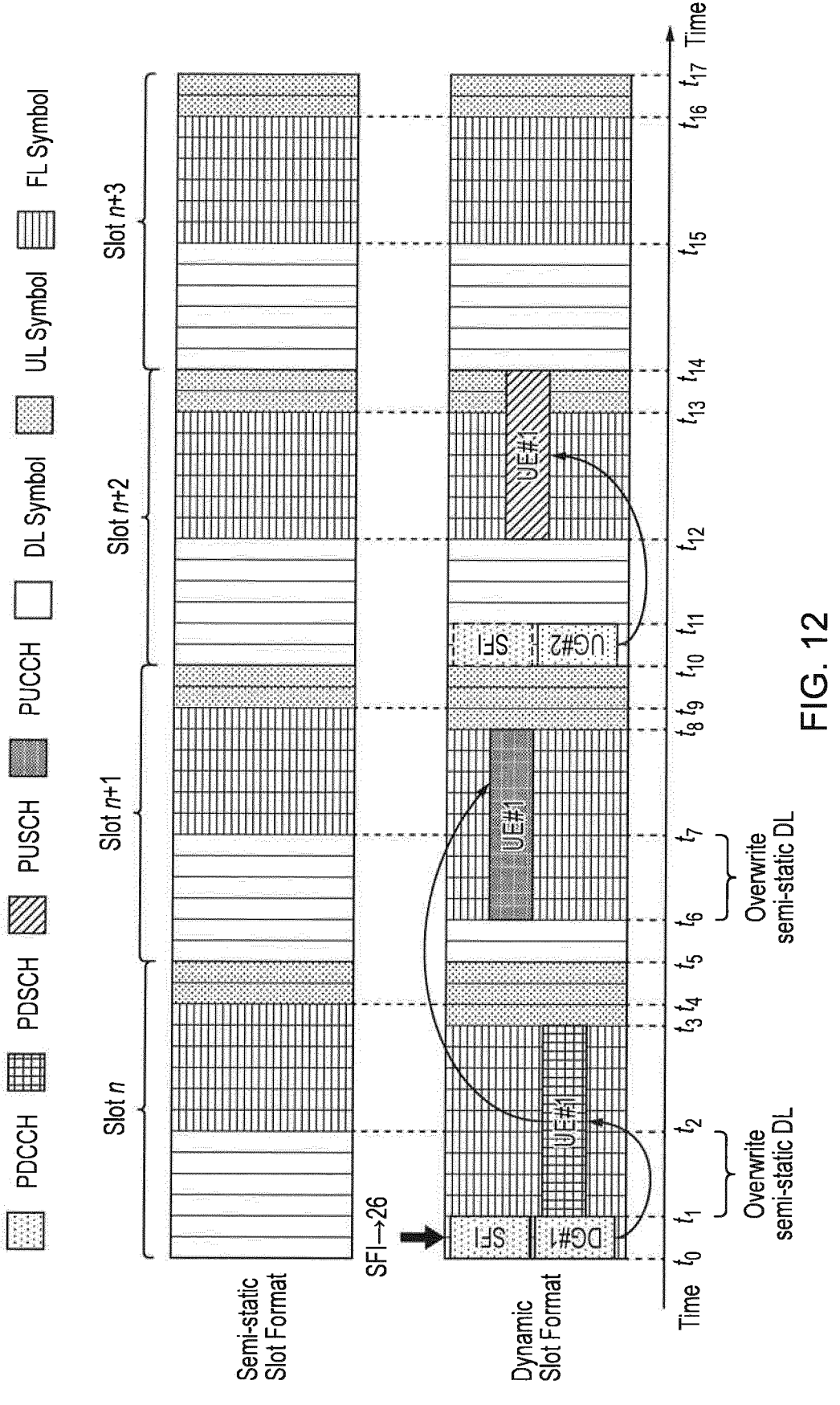
FIG. 12 illustrates how an SFI can be used to overwrite semi-statically configured downlink/uplink symbols in accordance with embodiments of the present technique.

An example is shown in FIG. 12, where UE #1 is configured with semi-static slot format {D, D, D, D, D, D, F, F, F, F, F, F, U, U} but at time $t_1$, the UE detects an SFI where the value of the Slot Format Combination ID maps to a slot format with index 26 (i.e. one of the Slot Format Combination ID is configured to map to slot format index 26). This slot format with index 26 gives a pattern (as shown in the table of FIG. 4) of {D, D, F, F, F, F, F, F, F, F, F, U, U, U} for two slots, thereby overwriting the third to sixth semi-static DL symbols with FL symbols in Slot n and n+1. It should be noted here that the SFI can overwrite semi-statically configured DL symbols with UL and vice-versa, while this example also shows that they can also be over-written with FL symbols. UE #1 also receives DL Grant DG #1 at time $t_1$, which schedules a PDSCH occupying time $t_1$ to $t_3$ with a corresponding PUCCH occupying time $t_6$ to $t_8$. Here, the UE follows the SFI and overwrites semi-statically configured DL symbols at time $t_6$ to $t_7$ with UL symbols in order to transmit its PUCCH. The SFI has a period of $P_{SFI}=2$ slots. At time $t_{11}$, the UE does not detect any SFI, and hence it follows the semi-static slot format. Here, the UE receives an UL Grant, UG #2, scheduling a PUSCH between time $t_{12}$ to $t_4$, which does not overwrite any semi-static DL symbols.

In some arrangements of embodiments of the present disclosure, the overwrite indicator in the SFI is indicated using Slot Format Indices from 56 to 254. As shown earlier in the table of FIG. 4, these Slot Format indices are currently not used, and hence at least some of these indices can be used to indicate overwriting of semi-static DL and UL symbols. That is if the SFI indicates any indices below 56, it means the UE should follow legacy behaviour and should not overwrite any semi-statically configured DL and UL symbols. If the SFI indicates the new indices however, i.e. those between 56 and 254, the UE will follow the SFI instructions even if it overwrites semi-statically configured DL and UL symbols. In other words, the SFI may indicate one or more of a plurality of indices, and wherein the overwrite indicator is indicated by the SFI indicating one or more of a predefined subset of the plurality of indices.

It should be noted that not all of the indices from 56 to 254 may be needed for indicating of overwriting, but instead only some of them may be sufficient. For example, the indices from 0 to 55 can be replicated in 56 to 111, but the replicated indices allow overwriting. For example, indices 0 and 56 have the same slot format pattern but 56 can overwrite semi-statically configured UL/DL symbols, indices 1 and 57 have the same slot format pattern but 57 can overwrite semi-statically configured UL/DL symbols, and so on. That is, some implementations may comprise the division of the Slot Format into two sets where one set from 0 to 55 indicates legacy behaviour without overwriting and another set from 56 to 111 (or some other ranges of indices e.g. 64 to 100, which doesn't replicate the slot formats in 0 to 55) indicates overwriting. It should be noted that other arrangements of indices to indicate overwrite and not overwrite are possible, and this example is not intended to be limiting. For example, every odd index indicates overwrite, and every even index indicates not overwrite.

Figure 13:
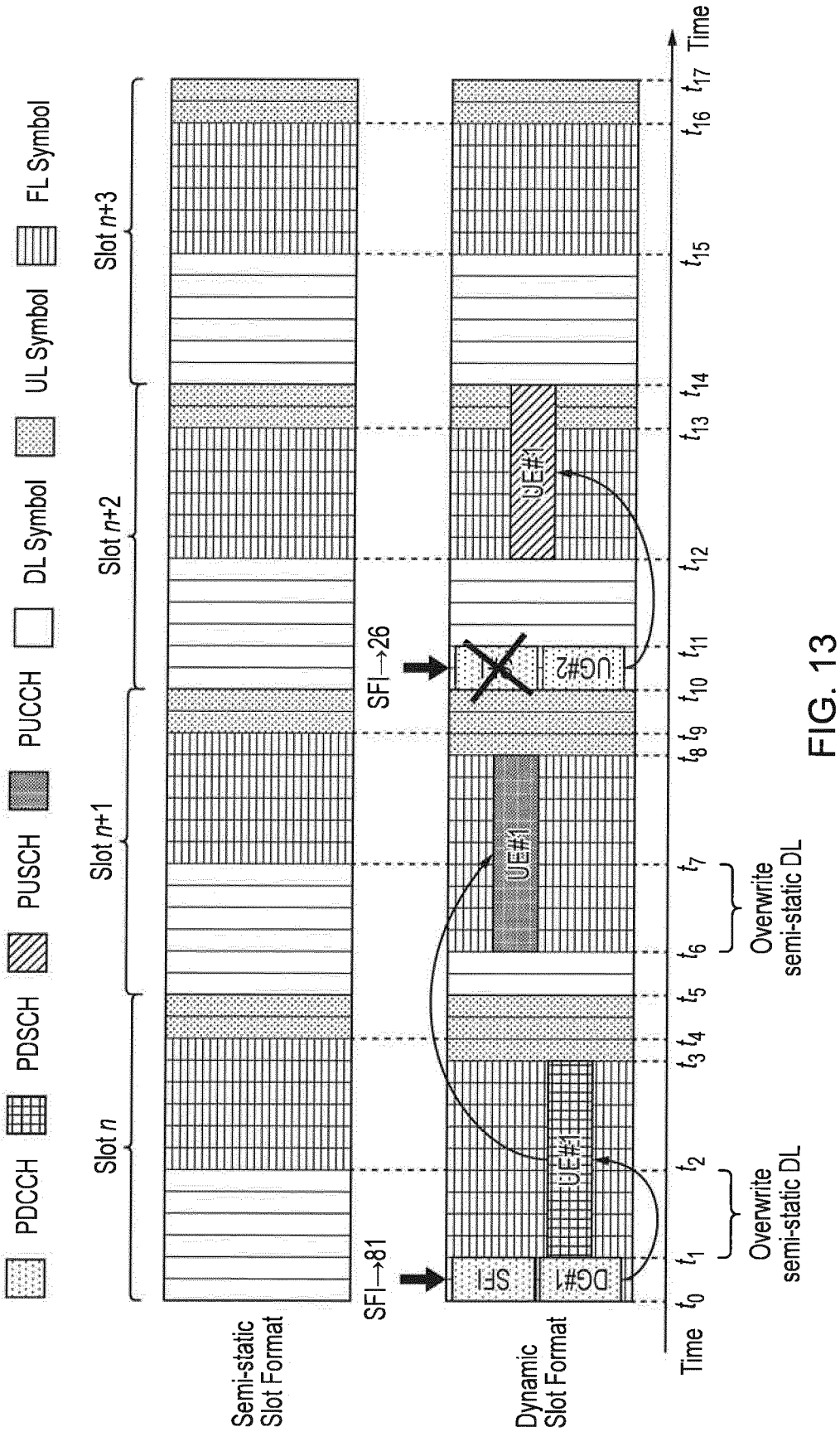
FIG. 13 illustrates how an SFI can indicate that semi-statically configured downlink/uplink symbols can be over-written using certain sets of indices in accordance with embodiments of the present technique.

An example where the Slot Format indices 56 to 111 replicated those from 0 to 55 is shown in FIG. 13, which has the same scenario as the example in FIG. 12 except that the Slot Format Combination IDs of the SFI maps to different set of indices to indicate whether to overwrite or not. At time $t_1$, the UE detects the SFI and maps to Slot Format 81, which does not exist for legacy UEs but for a new UE such as UE #1 this is the replica of Slot Format 26 (i.e. 55+26=81). Therefore, the UE uses the pattern {D, D, F, F, F, F, F, F, F, F, F, U, U, U} even though it needs to overwrite semi-statically configured DL symbols with FL symbols for the third to the sixth symbol in order to do so. At time $t_{11}$, the UE detects the SFI which maps to a Slot Format of 26, which belongs to the subset where the UE cannot overwrite semi-statically configured DL/UL symbols. But since this pattern indicates that it overwrites semi-statically configured DL symbols, the UE will assume that an error in decoding the SFI has occurred or that it is a false detection of SFI, which is represented with a cross in FIG. 13. The UE hence default back to using semi-static slot format configurations.

In some arrangements of embodiments of the present disclosure, the UE is RRC configured to perform overwriting of semi-static DL and UL symbols. In other words, the overwrite indicator may be received via radio resource control, RRC, signalling. Once the UE is RRC configured to enable overwriting, then there is no need for any further dynamic indicator to tell the UE to overwrite semi-static DL/UL symbols. The UE would follow either SFI and/or DL/UL Grants instructions even if they indicate or schedule transmissions that overwrites DL and/or UL symbols.

In some arrangements of embodiments of the present disclosure, only RRC signalling is allowed to overwrite or change the DL to UL or UL to DL, whereas the SFI and DCI can change only FL symbols to either DL or UL symbols. In other words, the communications device may be configured to determine whether the overwrite indicator is received via RRC signalling, and if the overwrite indicator is received via RRC signalling, determining the second pattern by overwriting at least the portion of the first pattern, or if the overwrite indicator is not received via RRC signalling, determining that the first pattern should be not be replaced by the second pattern. In an example implementation, the SFI and DCI can follow legacy behaviours, but the UE specific slot format configuration changes the Cell Common slot format by replacing some of the DL and UL symbols to FL symbols. This thereby allows the SFI and DCI to change such FL symbols dynamically to DL or UL symbols, hence enabling FD-TDD at least for HD-TDD UEs. Alternatively or additionally, a new RRC configuration may be introduced to change the resultant semi-static slot format after the combination of the legacy Common Cell slot format and the legacy UE specific slot format configurations.

The RRC signalling may simply indicate whether or not overwriting/changing DL and UL symbols indicated by higher order or previous configurations is allowed; a further DCI (e.g. a GC-DCI which may carry an SFI) may then actually indicate how the UE is to overwrite the configuration. In other words, the overwrite indicator (i.e. that is received via RRC signalling) indicates that the determining of the second pattern for the time-divided portion by the communications device is to be based on one of a GC-DCI or a DCI received from the wireless communications network.

In some arrangements of embodiments of the present disclosure, the UE is RRC configured to overwrite only certain slots. In other words, the overwrite indicator may indicate for which of the plurality of time-divided portions of the wireless radio interface a pattern is allowed to be overwritten. That is, the semi-static slot format of some slots cannot be overwritten. The RRC configuration can be a bitmap indicating which slots can be overwritten, e.g. marked with a "1" and which slots cannot be overwritten, e.g. marked with a "0".

In some arrangements of embodiments of the present disclosure, the UE is RRC configured to overwrite only a subset of OFDM symbols in a slot. In other words, the overwrite indicator may indicate which of the one or more uplink resource units and the one or more downlink resource units of the time-divided portion of the wireless radio interface are allowed to be overwritten. A 14-bit bitmap can be used to indicate which OFDM symbols in the slot can be overwritten, e.g. a "1" indicates overwriting is enabled and "0" indicates overwriting is disabled. Those skilled in the art would appreciate that such arrangements of embodiments of the present technique can be combined with the previously described arrangements where UEs are RRC configured to overwrite only certain slots. For example, for those slots that are indicated for overwriting, a further OFDM symbol level bitmap (14 bits) is used to further indicate which OFDM symbols in those indicated slots can be overwritten.

In some arrangements of embodiments of the present disclosure, a Medium Access Control (MAC) Control Element (CE) is used to indicate overwriting. In other words, the overwrite indicator may be received via a medium access control, MAC, control element. That is, the MAC CE is used to indicate certain slots and/or certain symbols that can be overwritten.

In some arrangements of embodiments of the present disclosure, the UE sends capability signalling to the network to indicate it has the capability to perform FD-TDD, and so can perform the overwrite operation. In other words, the communications device may be configured to transmit, to the wireless communications network (e.g., to the infrastructure equipment), capability information indicating a capability of the communications device, where here, the capability of the communications device may indicate that the communications device is able to operate in a full duplex mode. In other arrangements of embodiments of the present technique, the UE can dynamically change its capability to perform the overwrite operation, for example, only when the UE wants to boost its throughput. In other words, the communications device may be configured to dynamically change the capability information of the communications device. This may ensure that the UE and network can operate efficiently with less latency by the UE only indicating it is capable of performing the overwrite operation when it deems it necessary, thus avoiding unnecessary signalling of the overwrite indicator and unnecessary overwriting of the slot format configuration by the UE.

In some arrangements of embodiments of the present disclosure, the UE will send its preferable overwriting pattern to network e.g. via UCI or via a MAC CE, according to its sensing/measurement on interference. In other words, the communications device may be configured to transmit to the wireless communications network (e.g. to the infrastructure equipment), an indication of a preferred configuration of the second pattern for the time-divided portion of the wireless radio interface. Here, the communications device may be configured to transmit the indication of the preferred configuration via uplink control information, UCI, or via a MAC control element. This may help ensure that channel usage becomes more efficient, as the UE will ask that the network allow it to perform overwriting in such a way that DL and UL signals are transmitted at more optimal times, taking into account interference and/or channel conditions. Here, the wireless communications network (e.g. the infrastructure equipment) may be configured to transmit the overwrite indicator to the communications device based on the indication of the preferred configuration of the second pattern.

There may be one or more triggers for the network to send the overwrite indicator to the UE. Triggers for the overwrite indicator may include, but are not limited to:

UE's Buffer Status Report (BSR);
UE's measurement report; and
UE's capability signalling to indicate it is ready to perform FD-TDD.

In other words, the communications device may be configured to transmit to the wireless communications network (e.g. to the infrastructure equipment), a buffer status report, wherein the overwrite indicator is received in response to transmitting the buffer status report, and/or to transmit, to the wireless communications network (e.g. to the infrastructure equipment), a measurement report, wherein the overwrite indicator is received in response to transmitting the measurement report, and or to transmit, to the wireless communications network (e.g. to the infrastructure equipment), capability information indicating a capability of the communications device, wherein the overwrite indicator is received in response to transmitting the capability information.

It should be appreciated that arrangements of embodiments of the present technique as described above can be implemented individually or combined. For example, the overwriting indication in the SFI can be further combined with overwriting indicators in the DL and UL grants, such that DL and UL grants can overwrite DL and/or UL symbols indicated by the SFI, to provide further flexibility to individual UEs that monitor the GC-DCI carrying this SFI. It would be appreciated by those skilled in the art that such a combined implementation is merely an example, and is not intended to be limiting in any way. That is, any combination of two or more arrangements of embodiments of the present technique as described herein may be configured for a UE, provided that they are not contradictory.

Figure 14:
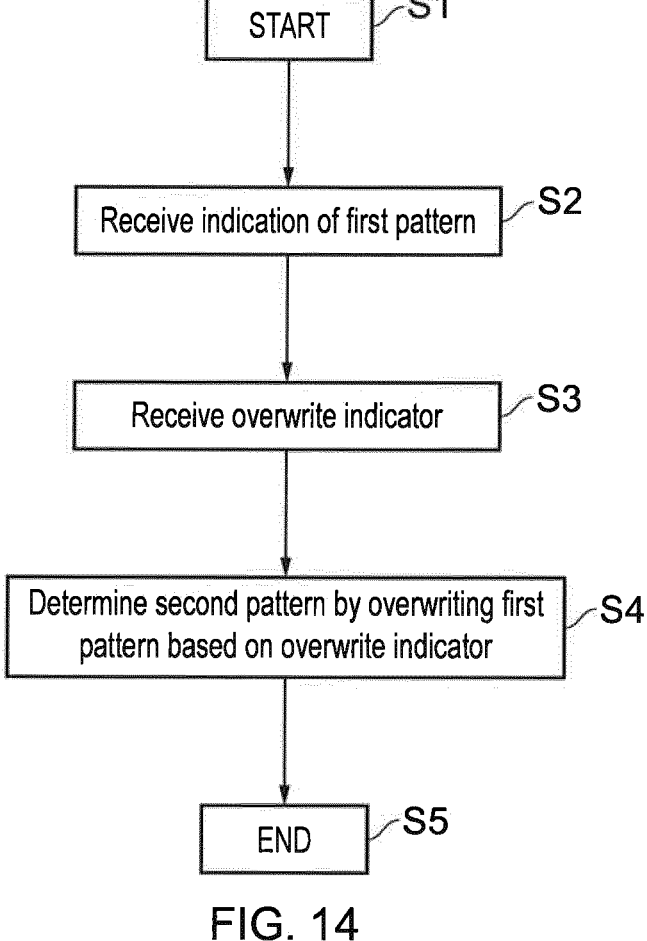
FIG. 14 shows a flow diagram illustrating a process of communications in a communications system in accordance with embodiments of the present technique.

FIG. 14 shows a flow diagram illustrating an example process of communications in a communications system in accordance with embodiments of the present technique. The process shown by FIG. 14 is a method of operating a communications device configured to transmit signals to and/or to receive signals from a wireless communications network (e.g. to or from an infrastructure equipment of the wireless communications network).

The method begins in step S1. The method comprises, in step S2, receiving an indication of a first pattern for one of a plurality of time-divided portions of the wireless radio interface from the wireless communications network (e.g. from an infrastructure equipment of the wireless communications network), the first pattern defining one or more uplink resource units for transmitting uplink data to the wireless communications network (e.g. to the infrastructure equipment) and/or one or more downlink resource units for receiving downlink data from the wireless communications network (e.g. from the infrastructure equipment). In step S3, the process comprises receiving an overwrite indicator from the wireless communications network (e.g. from the infrastructure equipment) indicating that the communications device is able to use at least one of the downlink resource units for transmitting uplink data to the wireless communications network (e.g. to the infrastructure equipment) and/or at least one of the uplink resource units for receiving downlink data from the wireless communications network (e.g. from the infrastructure equipment). Then, in step S4, the method comprises determining a second pattern for the time-divided portion of the wireless radio interface to replace the first pattern by overwriting at least a portion of the first pattern based on the overwrite indicator. The process ends in step S5.

Those skilled in the art would appreciate that the method shown by FIG. 14 may be adapted in accordance with embodiments of the present technique. For example, other intermediate steps may be included in this method, or the steps may be performed in any logical order. Though embodiments of the present technique have been described largely by way of the example communications system shown in FIG. 8, and further described with respect to the arrangements illustrated by FIGS. 9 to 13, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device configured to transmit signals to and/or to receive signals from a wireless communications network via a wireless radio interface provided by the wireless communications network, the method comprising receiving an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network, receiving an overwrite indicator from the wireless communications network indicating that the communications device is able to use at least one of the downlink resource units for transmitting uplink data to the wireless communications network and/or at least one of the uplink resource units for receiving downlink data from the wireless communications network, and determining a second pattern for the time-divided portion of the wireless radio interface to replace the first pattern by overwriting at least a portion of the first pattern based on the overwrite indicator.

Paragraph 2. A method according to Paragraph 1, wherein the overwrite indicator is received via downlink control information, DCI.

Paragraph 3. A method according to Paragraph 2, wherein the overwrite indicator is indicated by a dedicated bit carried by the DCI, the dedicated bit indicating whether or not the communications device should determine the second pattern by overwriting at least the portion of the first pattern.

Paragraph 4. A method according to Paragraph 2 or Paragraph 3, wherein the overwrite indicator is indicated by two dedicated bits carried by the DCI, wherein a first of the dedicated bits indicates whether the communications device is able to use the at least one of the downlink resource units for transmitting uplink data to the wireless communications network, and wherein a second of the dedicated bits indicates whether the communications device is able to use the at least one of the uplink resource units for receiving downlink data from the wireless communications network.

Paragraph 5. A method according to any of Paragraphs 2 to 4, wherein the overwrite indicator is indicated by a radio network temporary identifier, RNTI, associated with the DCI.

Paragraph 6. A method according to any of Paragraphs 2 to 5, wherein the DCI provides an indication of resources of the wireless radio interface within which the communications device is to transmit uplink data to the wireless communications network or receive downlink data from the wireless communications network, wherein the indicated resources comprise the time-divided portion of the wireless radio interface.

Paragraph 7. A method according to any of Paragraphs 2 to 6, wherein the DCI is an activation DCI which indicates that at least one preconfigured resource instance of the wireless radio interface are activated and therefore are to be used by the communications device for transmitting uplink signals to the wireless communications network and/or receiving downlink signals from the wireless communications network, wherein the pre-configured resource instance comprises the time-divided portion of the wireless radio interface.

Paragraph 8. A method according to any of Paragraphs 2 to 7, wherein the DCI is a group-common DCI, GC-DCI, which is common between the communications device and one or more other communications devices.

Paragraph 9. A method according to Paragraph 8, wherein the overwrite indicator is indicated by a slot format indicator, SFI, the SFI being carried by the GC-DCI.

Paragraph 10. A method according to Paragraph 9, wherein the SFI indicates one or more of a plurality of indices, and wherein the overwrite indicator is indicated by the SFI indicating one or more of a predefined subset of the plurality of indices.

Paragraph 11. A method according to any of Paragraphs 1 to 10, wherein the overwrite indicator is received via radio resource control, RRC, signalling.

Paragraph 12. A method according to Paragraph 11, wherein the overwrite indicator indicates that the determining of the second pattern for the time-divided portion by the communications device is to be based on one of a GC-DCI or a DCI received from the wireless communications network.

Paragraph 13. A method according to Paragraph 11 or Paragraph 12, wherein the overwrite indicator indicates for which of the plurality of time-divided portions of the wireless radio interface a pattern is allowed to be overwritten.

Paragraph 14. A method according to any of Paragraphs 11 to 13, wherein the overwrite indicator indicates which of the one or more uplink resource units and the one or more downlink resource units of the time-divided portion of the wireless radio interface are allowed to be overwritten.

Paragraph 15. A method according to any of Paragraphs 1 to 14, comprising
determining whether the overwrite indicator is received via RRC signalling, and
if the overwrite indicator is received via RRC signalling, determining the second pattern by overwriting at least the portion of the first pattern, or
if the overwrite indicator is not received via RRC signalling, determining that the first pattern should be not be replaced by the second pattern.

Paragraph 16. A method according to any of Paragraphs 1 to 15, wherein the overwrite indicator is received via a medium access control, MAC, control element.

Paragraph 17. A method according to any of Paragraphs 1 to 16, comprising
transmitting, to the wireless communications network, an indication of a preferred configuration of the second pattern for the time-divided portion of the wireless radio interface.

Paragraph 18. A method according to Paragraph 17, comprising
transmitting the indication of the preferred configuration via uplink control information, UCI.

Paragraph 19. A method according to Paragraph 17 or Paragraph 18, comprising
transmitting the indication of the preferred configuration via a MAC control element.

Paragraph 20. A method according to any of Paragraphs 1 to 19, comprising
transmitting, to the wireless communications network, a buffer status report,
wherein the overwrite indicator is received in response to transmitting the buffer status report.

Paragraph 21. A method according to any of Paragraphs 1 to 20, comprising
transmitting, to the wireless communications network, a measurement report,
wherein the overwrite indicator is received in response to transmitting the measurement report.

Paragraph 22. A method according to any of Paragraphs 1 to 21, comprising
transmitting, to the wireless communications network, capability information indicating a capability of the communications device,
wherein the overwrite indicator is received in response to transmitting the capability information.

Paragraph 23. A method according to Paragraph 22, wherein the capability of the communications device indicates that the communications device is able to operate in a full duplex mode.

Paragraph 24. A method according to Paragraph 22 or Paragraph 23, comprising
dynamically changing the capability information of the communications device.

Paragraph 25. A communications device comprising
transceiver circuitry configured to transmit signals to and/or to receive signals from a wireless communications network via a wireless radio interface provided by the wireless communications network, and
controller circuitry configured in combination with the transceiver circuitry
to receive an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network,
to receive an overwrite indicator from the wireless communications network indicating that the communications device is able to use at least one of the downlink resource units for transmitting uplink data to the wireless communications network and/or at least one of the uplink resource units for receiving downlink data from the wireless communications network, and
to determine a second pattern for the time-divided portion of the wireless radio interface to replace the first pattern by overwriting at least a portion of the first pattern based on the overwrite indicator.

Paragraph 26. Circuitry for a communications device comprising
transceiver circuitry configured to transmit signals to and/or to receive signals from a wireless communications network via a wireless radio interface provided by the wireless communications network, and
controller circuitry configured in combination with the transceiver circuitry
to receive an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network, to receive an overwrite indicator from the wireless communications network indicating that the communications device is able to use at least one of the downlink resource units for transmitting uplink data to the wireless communications network and/or at least one of the uplink resource units for receiving downlink data from the wireless communications network, and to determine a second pattern for the time-divided portion of the wireless radio interface to replace the first pattern by overwriting at least a portion of the first pattern based on the overwrite indicator.

Paragraph 27. A method of operating an infrastructure equipment forming part of a wireless communications network configured to transmit signals to and/or to receive signals from a communications device via a wireless radio interface provided by the infrastructure equipment, the method comprising transmitting an indication of a first pattern for one of a plurality of time-divided portions of the wireless radio interface to the communications device, the first pattern defining one or more uplink resource units for the communications device to transmit uplink data to the wireless communications network and/or one or more downlink resource units for the communications device to receive downlink data from the wireless communications network, transmitting an overwrite indicator to the communications device indicating that the communications device is able to use at least one of the downlink resource units for transmitting uplink data to the wireless communications network and/or at least one of the uplink resource units for receiving downlink data from the wireless communications network, and determining that the communications device will replace the first pattern with a second pattern for the time-divided portion of the wireless radio interface by overwriting at least a portion of the first pattern based on the overwrite indicator.

Paragraph 28. A method according to Paragraph 27, comprising transmitting the overwrite indicator via downlink control information, DCI.

Paragraph 29. A method according to Paragraph 28, wherein the overwrite indicator is indicated by a dedicated bit carried by the DCI, the dedicated bit indicating whether or not the communications device should determine the second pattern by overwriting at least the portion of the first pattern.

Paragraph 30. A method according to Paragraph 28 or Paragraph 29, wherein the overwrite indicator is indicated by two dedicated bits carried by the DCI, wherein a first of the dedicated bits indicates whether the communications device is able to use the at least one of the downlink resource units for transmitting uplink data to the wireless communications network, and wherein a second of the dedicated bits indicates whether the communications device is able to use the at least one of the uplink resource units for receiving downlink data from the wireless communications network.

Paragraph 31. A method according to any of Paragraphs 28 to 30, wherein the overwrite indicator is indicated by a radio network temporary identifier, RNTI, associated with the DCI.

Paragraph 32. A method according to any of Paragraphs 28 to 31, wherein the DCI provides an indication of resources of the wireless radio interface within which the communications device is to transmit uplink data to the wireless communications network or receive downlink data from the wireless communications network, wherein the indicated resources comprise the time-divided portion of the wireless radio interface.

Paragraph 33. A method according to any of Paragraphs 28 to 32, wherein the DCI is an activation DCI which indicates that at least one preconfigured resource instance of the wireless radio interface are activated and therefore are to be used by the communications device for transmitting uplink signals to the wireless communications network and/or receiving downlink signals from the wireless communications network, wherein the pre-configured resource instance comprises the time-divided portion of the wireless radio interface.

Paragraph 34. A method according to any of Paragraphs 28 to 33, wherein the DCI is a group-common DCI, GC-DCI, and wherein the method comprises transmitting the GC-DCI to the communications device and to one or more other communications devices.

Paragraph 35. A method according to Paragraph 34, wherein the overwrite indicator is indicated by a slot format indicator, SFI, the SFI being carried by the GC-DCI.

Paragraph 36. A method according to Paragraph 35, wherein the SFI indicates one or more of a plurality of indices, and wherein the overwrite indicator is indicated by the SFI indicating one or more of a predefined subset of the plurality of indices.

Paragraph 37. A method according to any of Paragraphs 27 to 36, comprising transmitting the overwrite indicator via radio resource control, RRC, signalling.

Paragraph 38. A method according to Paragraph 37, wherein the overwrite indicator indicates that the determining of the second pattern for the time-divided portion by the communications device is to be based on one of a GC-DCI or a DCI received from the wireless communications network.

Paragraph 39. A method according to Paragraph 37 or Paragraph 38, wherein the overwrite indicator indicates for which of the plurality of time-divided portions of the wireless radio interface a pattern is allowed to be overwritten.

Paragraph 40. A method according to any of Paragraphs 37 to 39, wherein the overwrite indicator indicates which of the one or more uplink resource units and the one or more downlink resource units of the time-divided portion of the wireless radio interface are allowed to be overwritten.

Paragraph 41. A method according to any of Paragraphs 27 to 40, comprising transmitting the overwrite indicator via a medium access control, MAC, control element.

Paragraph 42. A method according to any of Paragraphs 27 to 41, comprising receiving, from the communications device, an indication of a preferred configuration of the second pattern for the time-divided portion of the wireless radio interface.

Paragraph 43. A method according to Paragraph 42, comprising receiving the indication of the preferred configuration via uplink control information, UCI.

Paragraph 44. A method according to Paragraph 42 or Paragraph 43, comprising receiving the indication of the preferred configuration via a MAC control element.

Paragraph 45. A method according to any of Paragraphs 42 to 44, comprising transmitting the overwrite indicator to the communications device based on the indication of the preferred configuration of the second pattern.

Paragraph 46. A method according to any of Paragraphs 27 to 45, comprising receiving, from the communications device, a buffer status report, and transmitting the overwrite indicator in response to receiving the buffer status report.

Paragraph 47. A method according to any of Paragraphs 27 to 46, comprising receiving, from the communications device, a measurement report, and transmitting the overwrite indicator in response to receiving the measurement report.

Paragraph 48. A method according to any of Paragraphs 27 to 47, comprising receiving, from the communications device, capability information indicating a capability of the communications device, and transmitting the overwrite indicator in response to receiving the capability information.

Paragraph 49. A method according to Paragraph 48, wherein the capability of the communications device indicates that the communications device is able to operate in a full duplex mode.

Paragraph 50. An infrastructure equipment forming part of a wireless communications network comprising transceiver circuitry configured to transmit signals to and/or to receive signals from a communications device via a wireless radio interface provided by the infrastructure equipment, and controller circuitry configured in combination with the transceiver circuitry to transmit an indication of a first pattern for one of a plurality of time-divided portions of the wireless radio interface to the communications device, the first pattern defining one or more uplink resource units for the communications device to transmit uplink data to the wireless communications network and/or one or more downlink resource units for the communications device to receive downlink data from the wireless communications network, to transmit an overwrite indicator to the communications device indicating that the communications device is able to use at least one of the downlink resource units for transmitting uplink data to the wireless communications network and/or at least one of the uplink resource units for receiving downlink data from the wireless communications network, and to determine that the communications device will replace the first pattern with a second pattern for the time-divided portion of the wireless radio interface by overwriting at least a portion of the first pattern based on the overwrite indicator.

Paragraph 51. Circuitry for an infrastructure equipment forming part of a wireless communications network comprising transceiver circuitry configured to transmit signals to and/or to receive signals from a communications device via a wireless radio interface provided by the infrastructure equipment, and controller circuitry configured in combination with the transceiver circuitry to transmit an indication of a first pattern for one of a plurality of time-divided portions of the wireless radio interface to the communications device, the first pattern defining one or more uplink resource units for the communications device to transmit uplink data to the wireless communications network and/or one or more downlink resource units for the communications device to receive downlink data from the wireless communications network, to transmit an overwrite indicator to the communications device indicating that the communications device is able to use at least one of the downlink resource units for transmitting uplink data to the wireless communications network and/or at least one of the uplink resource units for receiving downlink data from the wireless communications network, and to determine that the communications device will replace the first pattern with a second pattern for the time-divided portion of the wireless radio interface by overwriting at least a portion of the first pattern based on the overwrite indicator.

Paragraph 52. A wireless communications system comprising a communications device according to Paragraph 25 and an infrastructure equipment according to Paragraph 50.

Paragraph 53. A computer program comprising instructions which, when loaded onto a computer, cause the computer to perform a method according to any of Paragraphs 1 to 24 or Paragraphs 27 to 49.

Paragraph 54. A non-transitory computer-readable storage medium storing a computer program according to Paragraph 53.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS #38.213, "NR: Physical layer procedures for control (Release 16)", v16.6.0, June 2021.

[2] Holma H. and Toskala A, "LTE for UMTS OFDMA and SC-FDMA based radio access", John Wiley and Sons, 2009.

[3] RWS-210026, "On NR Full Duplex," Qualcomm, 3GPP TSG RAN Rel-18 workshop, Jun. 28-Jul. 2, 2021.

[4] European patent No. 3545716.

[5] 3GPP TS #38.211, "NR: Physical channels and modulation (Release 16)", v16.6.0, June 2021.

What is claimed is:

1. A method of operating a communications device configured to transmit signals to and/or to receive signals from a wireless communications network via a wireless radio interface provided by the wireless communications network, the method comprising receiving an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network, receiving an overwrite indicator from the wireless communications network indicating that the communications device is able to use at least one of the downlink resource units for transmitting uplink data to the wireless communications network and/or at least one of the uplink resource units for receiving downlink data from the wireless communications network, and determining a second pattern for the time-divided portion of the wireless radio interface to replace the first pattern by overwriting at least a portion of the first pattern based on the overwrite indicator.

2. A method according to claim 1, wherein the overwrite indicator is received via downlink control information, DCI.

3. A method according to claim 2, wherein the overwrite indicator is indicated by a dedicated bit carried by the DCI, the dedicated bit indicating whether or not the communications device should determine the second pattern by overwriting at least the portion of the first pattern.

4. A method according to claim 2, wherein the overwrite indicator is indicated by two dedicated bits carried by the DCI, wherein a first of the dedicated bits indicates whether the communications device is able to use the at least one of the downlink resource units for transmitting uplink data to the wireless communications network, and wherein a second of the dedicated bits indicates whether the communications device is able to use the at least one of the uplink resource units for receiving downlink data from the wireless communications network.

5. A method according to claim 2, wherein the overwrite indicator is indicated by a radio network temporary identifier, RNTI, associated with the DCI.

6. A method according to claim 2, wherein the DCI provides an indication of resources of the wireless radio interface within which the communications device is to transmit uplink data to the wireless communications network or receive downlink data from the wireless communications network, wherein the indicated resources comprise the time-divided portion of the wireless radio interface.

7. A method according to claim 2, wherein the DCI is an activation DCI which indicates that at least one preconfigured resource instance of the wireless radio interface are activated and therefore are to be used by the communications device for transmitting uplink signals to the wireless communications network and/or receiving downlink signals from the wireless communications network, wherein the pre-configured resource instance comprises the time-divided portion of the wireless radio interface.

8. A method according to claim 2, wherein the DCI is a group-common DCI, GC-DCI, which is common between the communications device and one or more other communications devices.

9. A method according to claim 8, wherein the overwrite indicator is indicated by a slot format indicator, SFI, the SFI being carried by the GC-DCI.

10. A method according to claim 9, wherein the SFI indicates one or more of a plurality of indices, and wherein the overwrite indicator is indicated by the SFI indicating one or more of a predefined subset of the plurality of indices.

11. A method according to claim 1, wherein the overwrite indicator is received via radio resource control, RRC, signalling.

12. A method according to claim 11, wherein the overwrite indicator indicates that the determining of the second pattern for the time-divided portion by the communications device is to be based on one of a GC-DCI or a DCI received from the wireless communications network.

13. A method according to claim 11, wherein the overwrite indicator indicates for which of the plurality of time-divided portions of the wireless radio interface a pattern is allowed to be overwritten.

14. A method according to claim 11, wherein the overwrite indicator indicates which of the one or more uplink resource units and the one or more downlink resource units of the time-divided portion of the wireless radio interface are allowed to be overwritten.

15. A method according to claim 1, comprising
determining whether the overwrite indicator is received via RRC signalling, and
if the overwrite indicator is received via RRC signalling, determining the second pattern by overwriting at least the portion of the first pattern, or
if the overwrite indicator is not received via RRC signalling, determining that the first pattern should be not be replaced by the second pattern.

16. A method according to claim 1, wherein the overwrite indicator is received via a medium access control, MAC, control element.

17. A method according to claim 1, comprising
transmitting, to the wireless communications network, an indication of a preferred configuration of the second pattern for the time-divided portion of the wireless radio interface.

18. A method according to claim 1, comprising
transmitting, to the wireless communications network, a buffer status report,
wherein the overwrite indicator is received in response to transmitting the buffer status report.

19. Circuitry for a communications device comprising
transceiver circuitry configured to transmit signals to and/or to receive signals from a wireless communications network via a wireless radio interface provided by the wireless communications network, and
controller circuitry configured in combination with the transceiver circuitry
to receive an indication of a first pattern for one of a plurality of time-divided portions of the wireless radio interface from the wireless communications network, the first pattern defining one or more uplink resource units for transmitting uplink data to the wireless communications network and/or one or more downlink resource units for receiving downlink data from the wireless communications network, to receive an overwrite indicator from the wireless communications network indicating that the communications device is able to use at least one of the downlink resource units for transmitting uplink data to the wireless communications network and/or at least one of the uplink resource units for receiving downlink data from the wireless communications network, and to determine a second pattern for the time-divided portion of the wireless radio interface to replace the first pattern by overwriting at least a portion of the first pattern based on the overwrite indicator.

20. Circuitry for an infrastructure equipment forming part of a wireless communications network comprising transceiver circuitry configured to transmit signals to and/or to receive signals from a communications device via a wireless radio interface provided by the infrastructure equipment, and controller circuitry configured in combination with the transceiver circuitry to transmit an indication of a first pattern for one of a plurality of time-divided portions of the wireless radio interface to the communications device, the first pattern defining one or more uplink resource units for the communications device to transmit uplink data to the wireless communications network and/or one or more downlink resource units for the communications device to receive downlink data from the wireless communications network, to transmit an overwrite indicator to the communications device indicating that the communications device is able to use at least one of the downlink resource units for transmitting uplink data to the wireless communications network and/or at least one of the uplink resource units for receiving downlink data from the wireless communications network, and to determine that the communications device will replace the first pattern with a second pattern for the time-divided portion of the wireless radio interface by overwriting at least a portion of the first pattern based on the overwrite indicator.

* * * * *